(12) United States Patent
Sagiraju et al.

(10) Patent No.: US 9,411,051 B2
(45) Date of Patent: Aug. 9, 2016

(54) SYSTEM, METHOD, AND APPARATUS FOR A SATELLITE NAVIGATIONAL SYSTEM RECEIVER TO SELECT A SUBSET OF TRACKING SATELLITES

(71) Applicant: Samsung Electronics Co., Ltd., Gyeonggi-do (KR)

(72) Inventors: Phanikrishna Sagiraju, Cedar Rapids, IA (US); Makarand Phatak, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 455 days.

(21) Appl. No.: 13/959,280

(22) Filed: Aug. 5, 2013

(65) Prior Publication Data
US 2014/0354476 A1 Dec. 4, 2014

Related U.S. Application Data

(60) Provisional application No. 61/828,049, filed on May 28, 2013.

(51) Int. Cl.
*G01S 19/28* (2010.01)
*G01S 19/33* (2010.01)

(52) U.S. Cl.
CPC . *G01S 19/28* (2013.01); *G01S 19/33* (2013.01)

(58) Field of Classification Search
CPC .................................. G01S 19/28; G01S 19/31
USPC ........... 342/357.63, 357.67, 357.71; 701/468, 701/475
See application file for complete search history.

(56) References Cited

U.S. PATENT DOCUMENTS

| | | | |
|---|---|---|---|
| 8,106,823 B2 | 1/2012 | Schroth | |
| 2011/0057833 A1* | 3/2011 | France et al. | ............ 342/357.25 |
| 2013/0002485 A1 | 1/2013 | Pratt et al. | |
| 2013/0017840 A1* | 1/2013 | Moeglein et al. | .......... 455/456.1 |

OTHER PUBLICATIONS

Langley, Richard B., Dilution of Precision, GPS World May 1999, pp. 52-59.
Blanco-Delgado, Nuria et al., Satellite Selection Method for Multi-Constellation . . . , IEEE Transactions on Vehicular Technology, vol. 59, No. 9, Nov. 2010, pp. 4289-4297.

* cited by examiner

*Primary Examiner* — Dao Phan
(74) *Attorney, Agent, or Firm* — The Farrell Law Firm, P.C.

(57) ABSTRACT

Systems, methods, and apparatuses for a satellite navigational system receiver to select a subset of tracking satellites from the satellites in view are described. In one method, after selecting the satellite with a highest elevation, satellites are selected for the tracking subset by searching the sectors of an azimuth plane map in sequence.

23 Claims, 14 Drawing Sheets

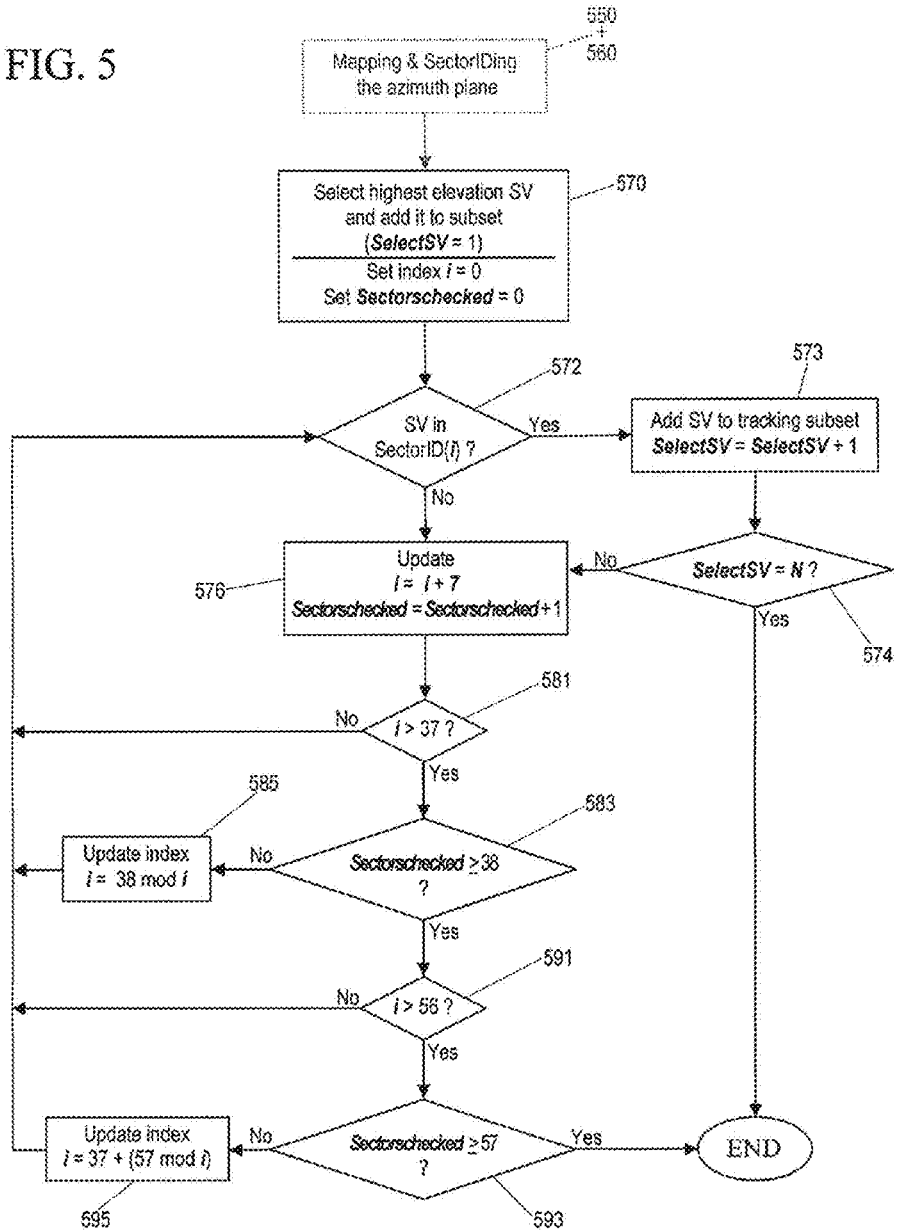

GPS + GLONASS

GPS

SYSTEM, METHOD, AND APPARATUS FOR A SATELLITE NAVIGATIONAL SYSTEM RECEIVER TO SELECT A SUBSET OF TRACKING SATELLITES

PRIORITY

This application claims priority under 35 U.S.C. §119(e) to U.S. Provisional Patent Application Ser. No. 61/828,049 filed on May 28, 2013, the entire disclosure of which is incorporated herein by reference.

BACKGROUND OF THE INVENTION

1. Field of the Invention

The present invention relates generally to selecting a set of satellites for tracking and navigation, and more particularly, to a satellite navigational system receiver selecting an optimum subset of tracking satellites from one or more satellite navigational system constellations.

2. Description of the Related Art

Satellite navigational systems provide positional information, normally geo-spatial, to earth-bound receivers. Each system has its own constellation of satellites orbiting the Earth, and, in order to calculate its position, a receiver in that system uses the satellites "in view" (i.e., in the sky above) of that system's constellation. Generally, the larger the number of satellites in view, the more accurate the calculation of the receiver's position will be. Global Navigational Satellite Systems (GNSS) is often used as the generic term for such systems, even though such navigational satellite systems include, e.g., regional and augmented systems—i.e., systems that are not truly "global." The term "GNSS," as used herein, covers any type of navigational satellite system, global or not, unless expressly indicated otherwise.

As the electronics for GNSS receivers have gotten smaller, and the positional calculations have become more accurate, the use of GNSS functions has become ubiquitous in consumer and other electronic devices, from cellular telephones to automobiles. And, as the number of uses for GNSS receivers has grown substantially and is still growing, the number of GNSS systems, both planned and presently operational, is also growing. The widely-known, widely-used, and truly global Global Positioning System (GPS) has been joined by one other global system, the GLObalnaya NAvigatsionnaya Sputnikovaya Sistema (GLONASS), and will be joined by the Galileo and COMPASS systems—each of which has, or will have, its own constellation of satellites orbiting the globe. Regional systems (those that are not global, but intended to cover only a certain region of the globe) include the Quasi-Zenith Satellite System (QZSS) and the Indian Regional Navigational Satellite System (IRNSS) currently being developed. Augmented systems (which are normally regional as well, and which "augment" with, e.g., messages from ground-based stations and/or additional navigational aids) include Wide Area Augmentation System (WAAS), European Geostationary Navigation Overlay Service (EGNOS), Multi-functional Satellite Augmentation System (MSAS), and GPS Aided Geo Augmented Navigation (GAGAN).

Since a GNSS receiver may be configured to use satellites from multiple GNSS systems, the ever-expanding number of GNSS constellations means an ever-increasing accuracy of positional calculation for GNSS receivers. However, there is a downside to a GNSS receiver using "too many" satellites for positional calculation because, after a certain number of satellites, the beneficial increase in accuracy is greatly outweighed by the detrimental increase in resources needed for tracking, receiving input, and doing the necessary processing for calculating the GNSS receiver's position based on the larger number of satellites.

The accuracy of a GNSS receiver may be understood in terms of Dilution of Precision (DOP). The various computations and "flavors" of DOP, such as geometrical DOP (GDOP), positional DOP (PDOP), horizontal DOP (HDOP), vertical DOP (VDOP), and time DOP (TDOP), are well-known to one of ordinary skill in the art, but the problem being measured by DOP may be simply described by the two dimensional analogy shown in FIG. 1. A receiver in FIG. 1 is using two radio transmitters to calculate its position. In (a), the two transmitters are almost at right angles to the receiver ("orthogonal"), which means their radio signals are also almost orthogonal to each other when received by the receiver in the overlapped zone at the center. In (b), the two transmitters are closer together, and the region where their signals overlap over the receiver is much wider and more diffuse. Thus, the positional DOP (PDOP) of the receiver using the two transmitters in (b) is high, while the PDOP of the receiver using the two transmitters in (a) is low. Simply put, the more orthogonal the signals, the lower the DOP.

A helpful way to view the problem of DOP in three dimensions is to consider the volume of the polyhedron formed by drawing lines between the GNSS receiver and each of the satellites being tracked. For example, in FIG. 2 (which is based upon a drawing in R. Langley, "Dilution of Precision," GPS World, May 1999, which is hereby incorporated by reference in its entirety), there are 4 satellite points 210, 220, 230, and 240 in the "sky," represented by the globe, and a GNSS receiver point 200 on the "ground," at the center of the globe. Drawing lines between GNSS receiver point 200 and all satellite points 210, 220, 230, and 240, as well as between contiguous satellite points 210, 220, 230, and 240, forms the tetrahedron shown in FIG. 2. The volume of that tetrahedron is highly correlated with the Geometric DOP (GDOP) of the GNSS receiver when using those four satellites. Thus, if one or more of the satellite points 220, 230, and 240 closer to the horizon (i.e., at the bottom of the tetrahedron) are moved closer to the satellite point 210 near the zenith (i.e., at the top of the tetrahedron), the volume of the tetrahedron would decrease, and the GDOP of the GNSS receiver using those four satellites would increase.

To consider the problem of increase in accuracy (i.e., decrease in DOP) based on having a larger number of satellites vs. the increase in resources for using that larger number of satellites, consider that a typical GNSS receiver may have 20 satellites in view at any point in time. The horizontal DOP (HDOP) for that GNSS receiver using all 20 satellites in view may be around 0.6, while using only 12 of those satellites provides an HDOP of 0.8. The decrease in HDOP when using 20 instead of 12 is minimal compared to, e.g., the amount of extra power and/or computing resources needed to track, process input, and calculate the GNSS receiver's location using those 8 additional satellites. Depending on the specific implementation and system involved, using only 12 satellites rather than all 20 may result in a nearly 50% power savings.

Thus, there are benefits for a GNSS receiver to select a subset of the total number of satellites in view for purposes of efficiently performing positional processing and calculation. However, the selection of that subset can be computationally expensive—i.e., quite a waste of resources in and of itself. Consider the following equation for calculating the number of different possible subsets of N satellites out of M total satellites in view:

$$\binom{M}{N} = \frac{M(M-1)(M-2)\ldots(M-N+1)}{N!} \quad (1)$$

Using this equation, we find that, for M=20 satellites in view, there are 125,970 different possible subsets of N=12 satellites from which the optimal tracking subset must be selected.

Currently, GNSS receivers use recursive algorithms to determine the subset/combination of satellites with the optimum DOP out of all of the possible subsets/combinations of N satellites from the M in view. This is a computationally burdensome task for a GNSS receiver, a burden which will continue to grow into the future, as new constellations of satellites go online (creating ever-larger Ms to choose from), the electronics (and available resources) for GNSS receivers continue to shrink, the usage and integration of GNSS receivers into other systems and devices grows, etc.

Thus, a solution is needed for a GNSS receiver to select an optimum tracking subset of satellites in view without burdensome calculations, such as, e.g., recursive DOP algorithms.

SUMMARY OF THE INVENTION

The present invention addresses at least the problems and disadvantages described above and provides at least the advantages described below. According to one aspect of the invention, a tracking subset of satellites in view is selected based on their locations, rather than on calculations of DOP. According to another aspect of the present invention, the azimuth plane of a GNSS receiver is mapped and divided into sectors, and satellites are selected for the tracking subset by searching a particular sequence of sectors. According to yet another aspect of the present invention, the mapping and searching of the azimuth plane for a tracking subset of satellites in view is adaptive, i.e., the parameters for mapping and/or searching are changed based on one or more present conditions of the GNSS receiver or system.

According to one embodiment of the present invention, a method for a receiver in a satellite navigational system to select a tracking subset of satellites from a set of satellites in view includes selecting a satellite with a highest elevation of the satellites in view for the tracking subset; and selecting a plurality of satellites for the tracking subset by searching, in a sequence, a plurality of sectors in an azimuth plane.

According to another embodiment of the present invention, a receiver in a satellite navigational system includes one or more processors and at least one non-transitory computer-readable medium having program instructions recorded thereon, the program instructions configured to have the one or more processors perform the steps of selecting, for a tracking subset of satellites from a set of satellites in view, a satellite with a highest elevation from the satellites in view; and selecting a plurality of satellites for the tracking subset by searching, in a sequence, a plurality of sectors in an azimuth plane.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 5 is a flowchart of a method for selecting a subset of satellites in view, using the SectorID map of FIG. 4, according to an embodiment of the present invention;

DETAILED DESCRIPTION OF EMBODIMENTS OF THE PRESENT INVENTION

Figure 2:
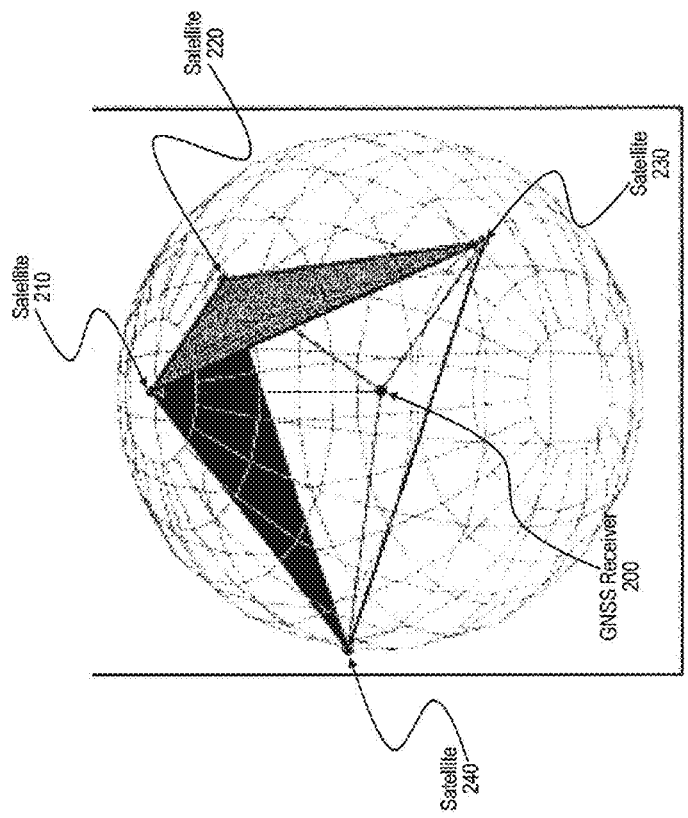
FIG. 2 is a diagram with a three-dimensional representation of DOP for a GNSS receiver and three satellites.
Figure 1:
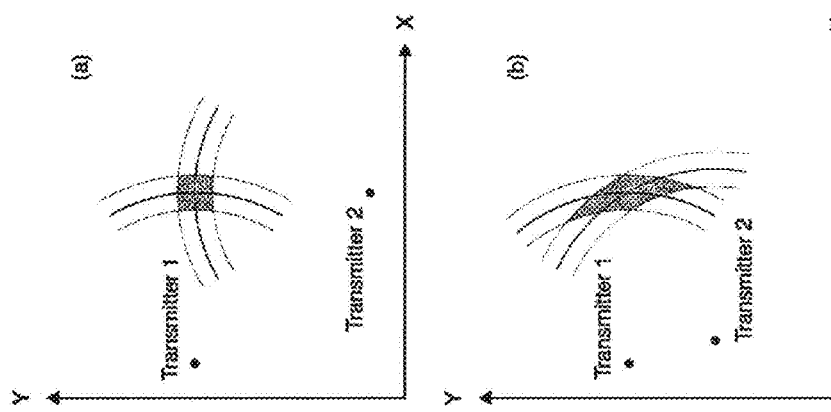
FIG. 1 is a diagram illustrating a simplified two-dimensional example of Dilution of Precision (DOP)

Various embodiments of the present invention will be described in detail below with reference to the accompanying drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

In general, the present application relates to selecting a subset of satellites used for tracking and navigation, but without performing the calculations necessary to determine the subset with the optimal DOP.

As discussed and shown above in reference to FIG. 2, any selection of four satellite points 210, 220, 230, and 240 where the resulting tetrahedron has less volume than the tetrahedron in FIG. 2 will likely result in an increase in the GDOP of the GNSS receiver. More generally, when using any number of satellites, the set of satellites whose resulting polyhedron has the greatest volume should provide the least DOP for the GNSS receiver—in other words, maximizing volume minimizes DOP. Using this insight, the present invention provides an innovative approach to selecting a subset of satellites in view, where the selected subset will result in a DOP comparable to the DOP of a subset selected by doing the intensive processing and computing to calculate the DOP of all possible subsets, and then selecting the best. Moreover, the present system, method, and apparatus selects a tracking subset that is comparable, if not effectively equivalent to, a subset selected by estimating and/or otherwise approximating the subset with the optimum DOP by use of measurement(s) and/or any other type of calculation(s)—in other words, the tracking subset selected by the approach of the present invention is comparable to a tracking subset selected by estimating and/or otherwise approximating the DOP calculations, but without the drain on resources and time required to perform any estimating/approximating algorithms and/or calculations. This is not to say that embodiments of the present invention exclude the use of any DOP calculations, estimations, and/or approximations, but rather to point out one of the advantages of the present invention. To the contrary, embodiments of the present invention include those where the innovative approach described and claimed herein supplements, replaces, and/or is substituted in for, one or more stages, steps, parts, and/or components of a tracking subset selection method, system, and/or apparatus that otherwise uses DOP calculations, estimations, and/or approximations. Indeed, the attendant benefits of applying the present innovative approach to any such methods, systems, and/or apparatuses would expressly suggest doing so.

Figure 3A:
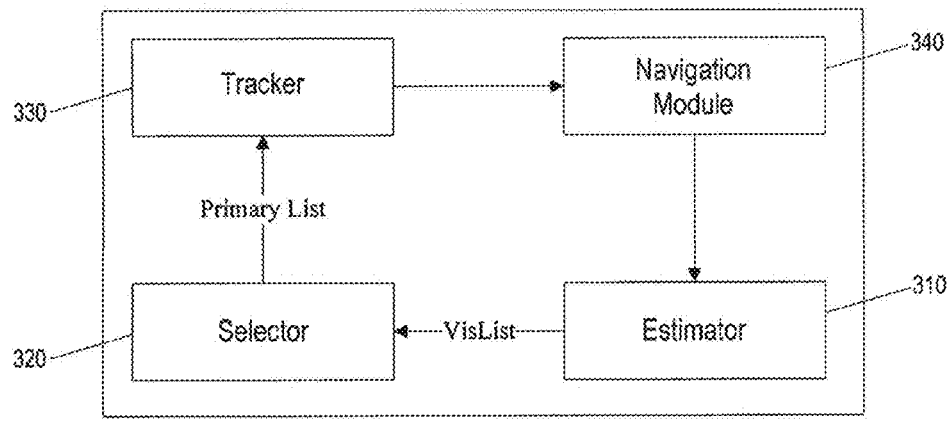
FIG. 3A illustrates a GNSS system for selecting a subset of satellites in view, according to an embodiment of the present invention.

FIG. 3A shows a GNSS system according to an embodiment of the present invention. The Estimator 310 estimates the present location of all satellites, or Space Vehicles (SVs), in view based on the GNSS receiver's location, the time, and previously stored information concerning the orbits of the SVs in one or more GNSS constellations. The resulting list ("VisList" or list of estimated visible satellites), including estimated azimuth and elevation coordinates for each satellite in view, is output to Selector 320 which divides the sky with the estimated locations of the SVs in view into sectors. The resulting sectored sky map is used to select the subset of SVs which will be used for navigational tracking, as will be described below. Once the subset is selected, Selector 320 outputs the resulting list ("Primary List") to Tracker 330, which tracks the SVs in the subset and provides the resulting data to Navigation Module 340, which uses the data to calculate and provide positional, timing, and other information. Navigation Module 340, in turn, updates Estimator 310, thereby creating a constantly repeating loop of estimating, selecting, tracking, calculating, and updating.

The feedback loop between the components in FIG. 3A makes the process adaptive, meaning that information concerning present conditions can be fed between components to further increase, e.g., the accuracy of the process. For example, if Tracker 330 determines that one or more SVs on the Primary List (received from Selector 320) are presently blocked from view, that information can be fed back to Estimator 310 and/or Selector 320 to eliminate those SVs from the process in the next loop. In one embodiment of the present invention, such blocking information is used to modify the selection process using the sectored sky map discussed above. Specifically, the information about a specific SV in a specific location being presently blocked is used to eliminate the sector in which the blocked SV is located from being used in the selection process. This is based on the inference that whatever is blocking the one SV (e.g., a building in an urban environment) is most likely blocking the entire immediate vicinity of the blocked SV. Eliminating the whole sector guarantees that the Primary List generated by Selector 320 in the next loop will not provide Tracker 330 with more selected SVs that are blocked.

FIG. 3A is a high-level abstraction of the functions involved in the system, meaning that, although hardware is necessarily involved with all of the functions described in reference thereto, the individual functions depicted therein may be merged together and/or further separated out (by dividing a function into subfunctions), and may be performed by software, hardware, or a combination of the two. For example, Estimator 310, Selector 320, Tracker 330, and Navigation Module 340 are depicted as separate entities (which the functions are, conceptually), but their functions may be implemented in the same piece of hardware, or partially overlap, or each be implemented in separate processors, or even one or more functions may be further broken down into sub-functions, which are performed on different processors. Moreover, the functionality may be further distributed, such as in an augmented system, where, for example, the VisList might be provided by local broadcast (in which case, Estimator 310 is not even part of the GNSS receiver). The possible functionality and/or various implementations of Estimator 310, Tracker 330, and Navigation Module 340 are well-known to one of ordinary skill in the art, although the specific implementations and/or functionalities may be called by different names depending on the embodiment. The specific implementation of these functionalities depends on the usage and type of GNSS receiver and satellite constellation(s) involved, as is well-known to one of ordinary skill in the art.

Figure 3B:
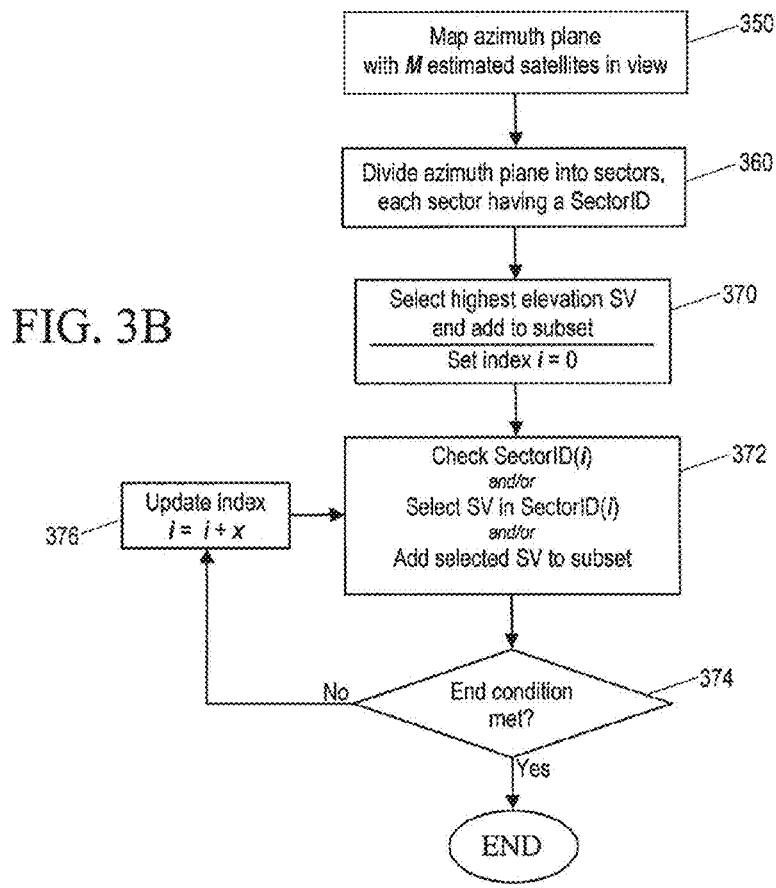
FIG. 3B is a flowchart of a method of selecting a subset of satellites in view, according to an embodiment of the present invention.

FIG. 3B is a flowchart of a method by which Selector 320 generates the subset (Primary List) of N satellites to be used for tracking, according to an embodiment of the present invention. In step 350, the azimuth plane including the estimated locations of the M SV's in view (provided by the VisList) is mapped. The "azimuth plane" will be further defined and discussed below, in reference to the example shown in FIG. 4. In step 360, the azimuth plane is divided into sectors, where each sector has its own SectorID, which in this case will be a number. The number of sectors, and how they divide up the azimuth plane, depend on the embodiment. In some embodiments, the number and mapping of the sectors can be made in order to maximize the possibility that there is at least one, and/or at most one, SV in each sector. In some embodiments, the number and/or mapping of sectors may be set or predetermined. In some embodiments, the number and/or mapping of the sectors may depend on the current operating conditions and/or environment of the GNSS receiver. In some embodiments, the number and/or mapping of the sectors may be determined externally, and transmitted to the GNSS receiver.

In step 370, the SV with the highest elevation is selected as the first member of the subset of satellites. This is equivalent to picking the top satellite point 210 in the tetrahedron shown in FIG. 2. Also in step 370, the index for the loop that follows is initialized to zero (i=0).

In step 372, it is determined whether the sector with SectorID=i has an SV in it. In embodiments where there may be more than one SV in a sector, a specific SV will have to be selected. If an SV is selected, it is added to the subset of tracking satellites. Step 372 has three possible substeps/components but is shown as one step in FIG. 3B because, depending on the embodiment (and, in particular, depending on how the azimuth plane is mapped), step 372 may only be one step. Conceptually, it can be considered the "selecting" step, where the implementation and complexity of the step is subject to an extremely wide variety of possibilities, depending on the GNSS receiver, the GNSS satellite constellations, and the goals of the designer, as will become clear when some specific embodiments are discussed below.

In step 374, it is determined whether the one or more end conditions have been met. End conditions can be, for example, when the desired total number N of satellites for the subset has been selected, and/or when all sectors in the azimuth plane have been checked. If the one or more end conditions have been met in step 374, the method ends. If not, index i is incremented by x in step 376, and the method loops back to the selecting step 372 where now the sector being checked has SectorID=i+x. The value of the x increment depends on the particular embodiment, including, most simply, one. In a specific embodiment discussed further below, x is selected to be prime, or co-prime/relatively prime with the number of azimuth divisions in the azimuth plane. In general, the loop defined by steps 372-374-376 continues until the one or more end conditions are met.

In all of the embodiments discussed herein, the highest elevation SV is selected as the first SV in the tracking subset (as shown herein in step 370), i.e., before the searching and selecting by sector begins (as shown herein by steps 372-374-376), but, as would be known to one of ordinary skill in the art, step 370 (the selection of the highest elevation SV) could occur after and/or during the searching and selecting steps 372-374-376.

Although particular embodiments of the present invention may be augmented by, e.g., DOP calculations and/or external measurements (as mentioned above), or may involve one or more steps from FIG. 3B being used in a system that otherwise uses, e.g., DOP calculations and/or external measurements, the mapping and looping through sectors of FIG. 3B involve no DOP calculations and no use of external measurements. Simply put, the system and method of FIGS. 3A and 3B rely on geometry. Because of this, and the relative simplicity of this innovative approach, there are a wide variety of possible ways to vary the embodiments of the present invention, including, but not limited to, changing the mapping of the azimuth plane; the number, size, and shape of the sectors; the pattern for checking sectors in the azimuth plane; the possible end condition(s); the specific programming (and/or hardwiring) of all of the preceding functions; the distribution of functions and/or tasks for implementing the approach of the present invention in a system or device; the use of embodiments of the present invention to supplement other methods, systems, and apparatuses, etc.

Like FIG. 3A, the method of FIG. 3B should be understood as a conceptual framework. For example, the steps do not necessarily need to occur in the order shown in FIG. 3B. Selecting the highest elevation SV in step 370 does not require the azimuth plane map, and thus could be performed before step 350. In some embodiments, one or more of the steps may be performed substantially simultaneously (or one or more steps may be in endless lockstep, as suggested by the endless loop between the components in FIG. 3A). Each step may be implemented in hardware, software, or a combination of hardware and software, and, as discussed in reference to FIG. 3A, one or more steps may be merged together and/or a single step may be further divided into sub-steps. Similarly, the steps may be performed on the same or completely different pieces of hardware, software, or combinations of hardware and software, and may be further distributed so that one or more steps or sub-steps are performed in devices and/or systems separate from the GNSS receiver. The specifics of how the one or more steps are merged, separated, and/or otherwise implemented in hardware, software, or a combination of hardware and software depends on a number of factors, as is well-known to one of ordinary skill in the art. Furthermore, the specific implementation of the present invention in a particular GNSS receiver will almost always require steps in addition to those shown in FIG. 3B, as will be demonstrated by example in reference to specific embodiments discussed below, and as would be understood by those of ordinary skill in the art.

Figure 4:
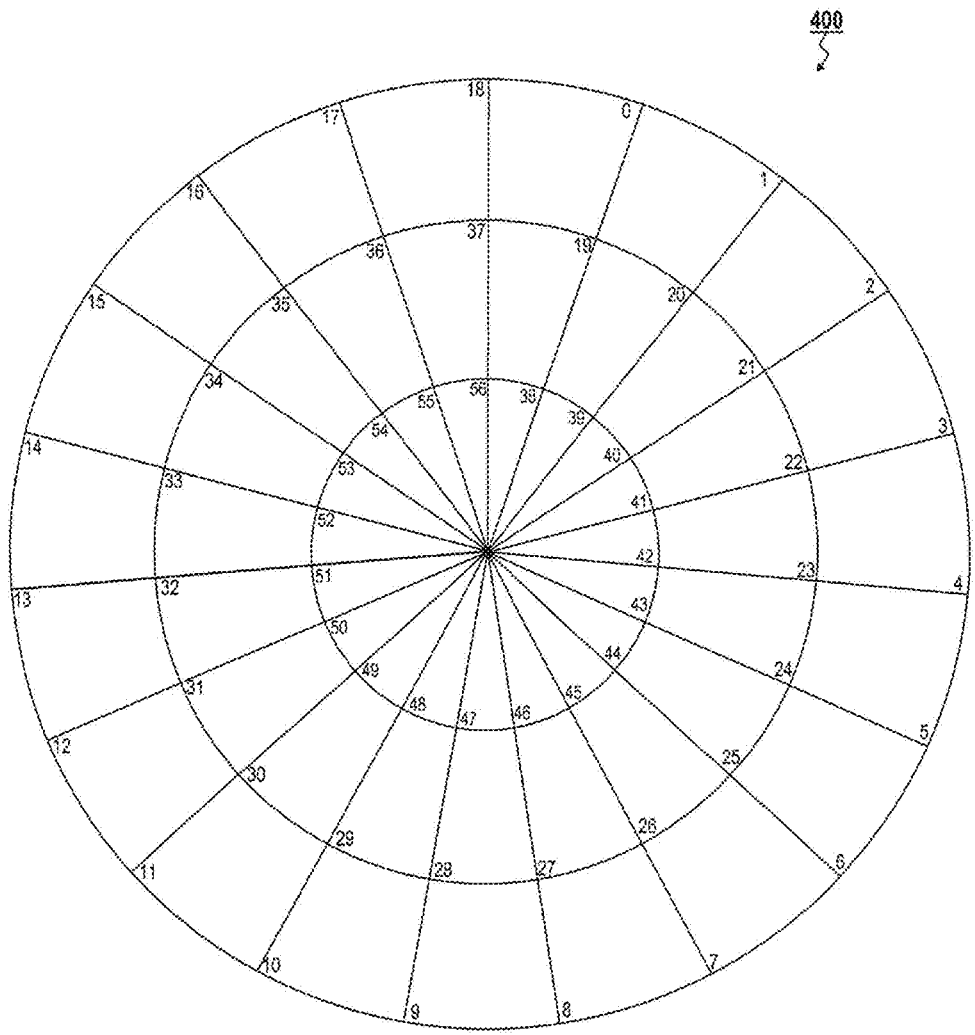
FIG. 4 illustrates the mapping and SectorID numbering of an azimuth plane, with 19 azimuth divisions split into three elevations, according to an embodiment of the present invention.

FIG. 4 illustrates an azimuth plane mapped with sectors showing their SectorID numbering, according to an embodiment of the present invention. Azimuth plane 400 can be understood as a two-dimensional representation of the sky above the GNSS receiver. In simple terms, the center is the zenith, i.e., the point directly overhead, and the circumference of the circle is the horizon. In FIG. 4, azimuth plane 400 has been cut into 19 "slices," with 18 slices of 19° and one of 18° (thereby totaling 360°), and further subdivided by three elevations, two of 32° and the top one of 26° (thereby totaling 90° from horizon to zenith), resulting in a total mapping of 57 sectors. The 57 sectors have been given SectorIDs comprising numbers in sequence, from 0 to 56, starting from the sectors on the horizon and continuing "upward" in elevation, towards the center. Although this is only an example, and other numbering schemes and/or the use of alphanumeric SectorIDs are conceivable for other embodiments of the present invention, numbering sequentially from zero is simple, and starting the SectorID numbering from the horizon has advantages in terms of the largest polyhedral volume, as discussed in reference to FIG. 2. Since the first SV in the tracking subset is the one closest to the zenith, the center, of azimuth plane 400 (i.e., the one with the highest elevation selected in step 370 of FIG. 3B), the next SVs selected should be as far away as possible from the center, which, of course, are those SVs nearest to the horizon. Since, once the selection of the highest elevation SV has occurred in step 370, the index for the loop consisting of steps 372-374-376 in FIG. 3B starts at zero (although, of course, other embodiments may start with another number, or even use a different type of sequence), the searching and selection according to this embodiment of the present invention will always start at the SVs in sectors on the horizon if the SectorID numbering starts there.

As stated above, FIG. 4 is only an example, and the ways to map the azimuth plane and/or to designate SectorIDs in numbers and/or alphanumeric characters is limited only by the specific implementation. For example, as will be discussed further below, the azimuth plane may be only divided by slices (with no divisions by elevations, such as the three elevations in FIG. 4), and the number of slices may vary depending on the GNSS system conditions and/or other factors. As another example, and by contrast with the sectors of varying size shown in FIG. 4, the azimuth plane could be mapped with equal-area sectors, where, e.g., while each elevation has sectors of equal width and height, but the sectors become much wider (and much fewer) the higher the elevation.

Furthermore, FIG. 4 is an idealized representation, with the radius of the circle representing the full 90° from horizon to the zenith overhead, whereas, in real-life, an elevation mask would be used to eliminate the first 5°-15° or so (depending on the implementation) up from the horizon because it is extremely likely to be obstructed by trees, buildings, and/or other parts of the local environment and, as such, any SVs in that region should not be considered as candidates for the tracking subset. These and other real-life factors, conditions, industry standards, and/or technological limitations and/or tolerances are well-known to those of ordinary skill in the art, and would be considered and factored into any implementation of the present invention.

FIG. 5 is a flowchart of a method for selecting a tracking subset from all of the satellites in view, using the SectorID map of FIG. 4, according to an embodiment of the present invention. Using the azimuth plane map of FIG. 4, the mapping and SectorIDing steps 550 and 560 (corresponding to steps 350 and 360 in FIG. 3), respectively, have already been performed, and the method starts with step 570. In step 570, the highest elevation SV is selected as the first SV in the subset of tracking satellites, thereby putting the total number of SVs in the subset at 1 (i.e., SelectSV=1). The iterative method is also initialized in step 570, by setting both the iterative index i and number of sectors checked Sectorschecked to 0.

In general, steps 570, 572, 574 (and 593), and 576 in FIG. 5 correspond to steps 370, 372, 374, and 376, respectively, in FIG. 3. The other two loops in FIG. 5 (i.e., steps 581-583-585 and steps 591-593-595) are essentially for implementing a particular search pattern through the azimuth plane. Specifically, the loop consisting of steps 581-583-585 is to ensure that all of the lower elevation sectors (i.e., 0-37 in FIG. 4) are checked before any of the highest elevation sectors (i.e., 38-56 in FIG. 4). There are several reasons for doing this, including, most saliently, the fact that the first SV selected, in step 570, is very likely to be in one of those highest elevation sectors and, in order to have the largest volume polyhedron, the next SV's selected should be as close as possible to the horizon. The second loop, comprising steps 591-593-595, is for going through the highest elevation sectors 38-56 and determining whether all of the sectors have been checked, in which case the method ends (making step 593 one of the two "end conditions" equivalent to step 374 in this embodiment).

Figure 6A:
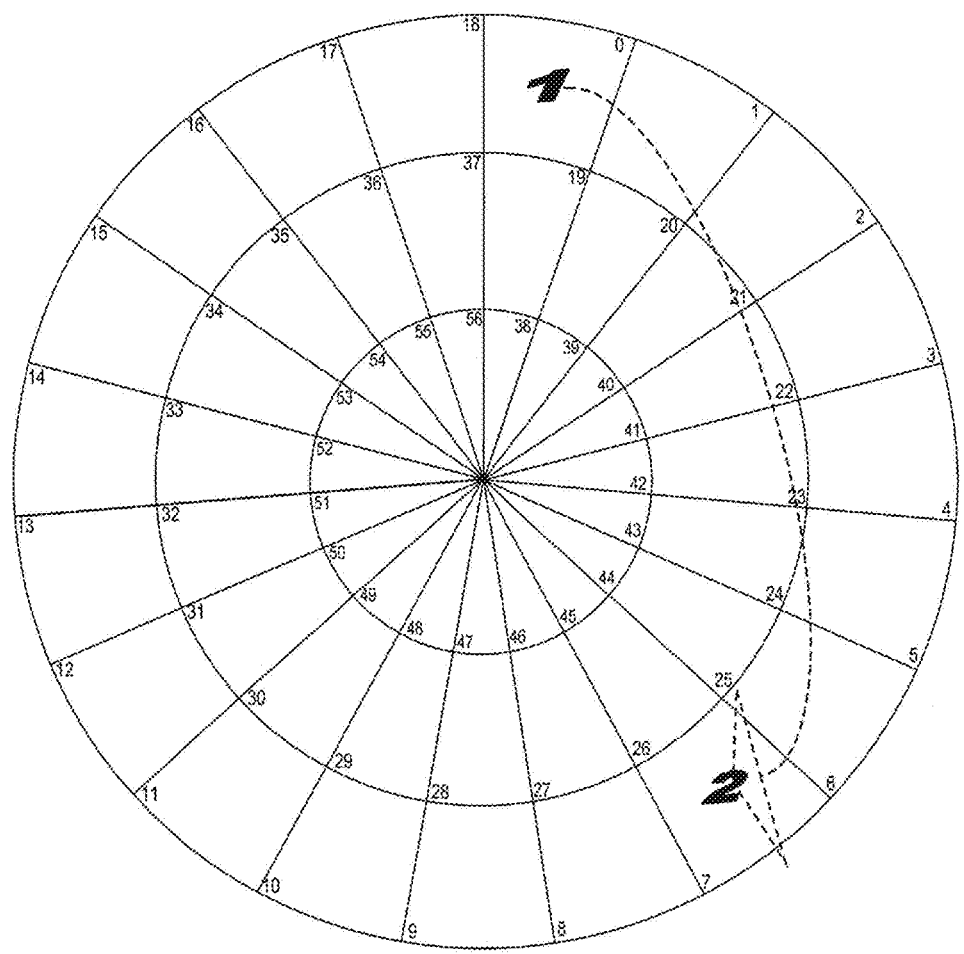
FIGS. 6A to 6C illustrate the performance of some of the steps in the method of FIG. 5, using the SectorID map of FIG. 4, according to an embodiment of the present invention.
Figure 6B:
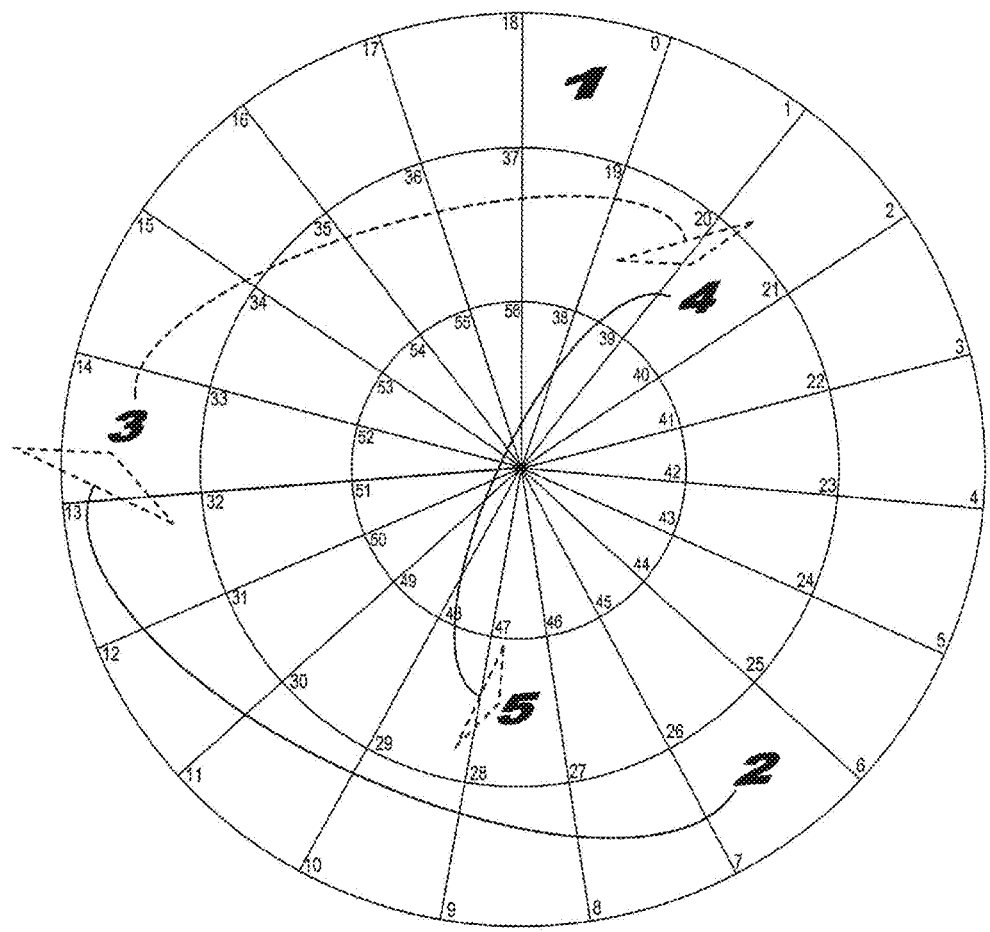
Figure 6C:
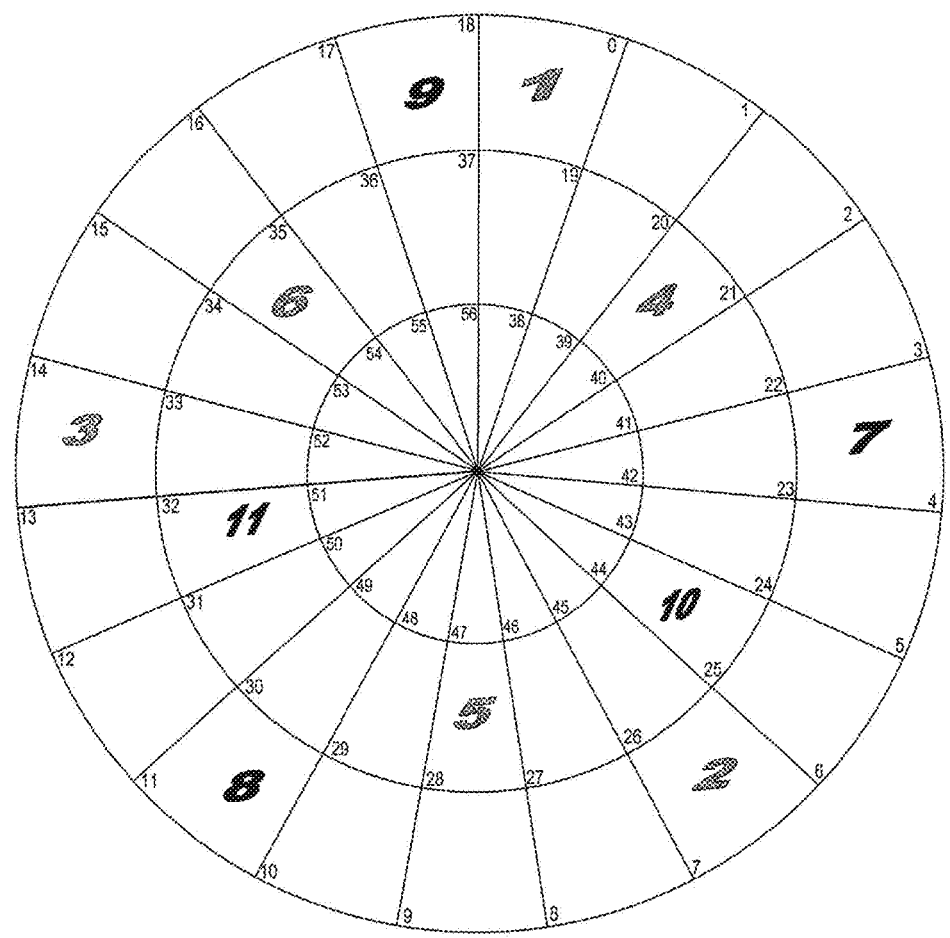

Specifically, going through the steps of FIG. 5 with reference to FIGS. 6A-6C, which show the first several iterations of the method in FIG. 5 checking sectors in the SectorID map of FIG. 4, step 572 checks whether there is an SV in the current sector, identified by SectorID(i), which has been initialized to 0 in step 570 and therefore corresponds to Sector 0 in the SectorID map of FIG. 4. Since Sector 0 is the first sector checked, it has a "1" in it in FIG. 6A. If an SV is found in the current sector, it is added to the subset of tracking SVs, and the count of SVs in the tracking subset is updated (SelectSV=SelectSV+1), in step 573. After step 573, it is determined in step 574 whether the number of SVs in the tracking subset has reached the desired total of N. If so, the method ends.

If no SV is found in the current sector in step 572, or the number of SVs in the tracking subset has not reached the desired total of N in step 574, the method continues with step 576, where the index is incremented by 7 (i=i+7) resulting in i=7, and the count of sectors checked is updated (Sectorschecked=Sectorschecked+1) resulting in Sectorschecked=1.

In this embodiment, both the incremental value (7) and the number of azimuth divisions (19) are prime numbers, although such a condition is not necessary in this or other embodiments of the present invention. In order to achieve a beneficial iterative search pattern according to this embodiment of the present invention, co-prime or relatively prime numbers can be used (i.e., the incremental value and the number of azimuth divisions being co-prime or relatively prime to each other). As will be shown with reference to FIGS. 6A-6B-6C below, choosing prime, co-prime, and/or relatively prime numbers results in widely spacing the sectors being checked per iterative loop, thereby resulting in a larger volume polyhedron (when, and if, SVs are found).

In step 581, it is determined whether the index is greater than 37. Since the index is now 7, the answer is "NO," and the method loops back up to step 572 to check whether there is an SV in the current sector, SectorID(i)=Sector 7 in the SectorID map of FIGS. 4 and 6. Since Sector 7 is the second sector checked, it has a "2" in it in FIG. 6A. Next, either directly from step 572 (if no SV is found) or indirectly through steps 573-574 (if an SV is found), as described above, the method reaches step 576, where the index is again incremented by 7 (i=i+7) resulting in i=14, and the count of sectors checked is updated (Sectorschecked=Sectorschecked+1) resulting in Sectorschecked=2. Since the index is still less than 37 in step 581, the method returns to checking step 572, where it is determined whether there is an SV in the current sector, SectorID(i)=Sector 14 in the SectorID map, resulting in a "3" in FIG. 6B indicating that Sector 14 was the third one checked in the method. Once again, either directly from step 572 (if no SV is found) or indirectly through steps 573-574 (if an SV is found), the method reaches step 576, where the index is again incremented by 7 (i=i+7) resulting in i=21, and the count of sectors checked is updated (Sectorschecked=Sectorschecked+1) resulting in Sectorschecked=3. Since the index is still less than 37 in step 581, the method returns to checking step 572, where it is determined whether there is an SV in the current sector, SectorID(i)=Sector 21 in the SectorID map, resulting in a "4" in FIG. 6B indicating that Sector 21 was the fourth one checked in the method. The method loops again, resulting in Sector 28 being the fifth one checked, resulting in a "5" in that sector in FIG. 6B.

As shown in FIG. 6B, the first five sectors checked are relatively widely scattered, resulting in a larger volume polyhedron (and a lesser DOP) if SVs are found in one or more of those checked sectors. The choice of prime, co-prime, or relatively prime numbers for the number of azimuth divisions and the incremental value results in the best possible scattering, with the minimum number of loops, in this embodiment of the present invention.

As shown in FIG. 6C, the last sector checked in the first iterative loop of the method is Sector 35 (labeled "6" as the $6^{th}$ sector checked), thereby making the first iterative loop Sectors 0 (1), 7 (2), 14 (3), 21 (4), 28 (5), and 35 (6), where the sequence of sectors checked (1-6) is shown in gray in FIG. 6C. After Sectorschecked=6 and index i=35 at the end of that loop, the index i is updated to 42 in step 576, resulting, for the first time, in a "YES" in step 581 (i>37?). Then, it is determined in step 583 whether Sectorschecked≥38, in which case all of the lower elevation sectors would have been checked. Since Sectorschecked=6, the method continues at step 586, where index i is updated (i=(38 mod i)), resulting in index i=4, thereby starting the second loop through the lower elevation sectors. This indicates how steps 581-583-585 ensure that all of the lower elevation sectors (0-37) are checked before the highest elevation sectors (38-56). FIG. 6C shows which sectors are checked in the second iterative loop through the lower elevation sectors, namely, Sectors 4 (7), 11 (8), 18 (9), 25 (10), and 32 (11). Once again, FIG. 6C shows that the method continues to result in the sectors being fairly scattered over the azimuth plane.

The selection of the appropriate prime, co-prime, or relatively prime number for the incremental value depends on various factors, including the granularity of the desired end result. In this example, as shown in FIG. 6C, the selection of 7 as the incremental value results in 3 sectors being searched in each elevation before moving to the next elevation—i.e., 1, 2, and 3 are in the first elevation; 4, 5, 6 are in the second elevation; 7, 8, 9 returns to the first elevation, and so on. Choosing smaller or larger incremental values would result in more or less sectors being searched per elevation in this embodiment. The use of prime, co-prime, or relatively prime numbers ensures that no sector is visited twice.

After all of the lower 38 sectors are checked (although, depending on the desired number N of SVs in the tracking subset and the number of satellites in view at the time, it is likely the method may end before reaching that point, through step 574), there is a "YES" in response to step 583 (Sector-schecked≥38?), and it is determined, in step 591, whether index i>56. If not, the method loops back to checking step 572. If index i>56 in step 591, it is determined whether all of the sectors have been checked in step 593 (Sector-schecked≥57?), in which case the method ends. If it is determined in step 593 that not all of the sectors have been checked, index i is updated in step 595 (i=37+(57 mod i)), which guarantees that the index stays within the 38-56 range for the highest elevation sectors, and the method returns to checking step 572.

As mentioned above, the method according to the embodiment of the present invention shown in FIG. 5 results in, inter alia, (i) the sectors checked being widely scattered in the azimuth plane (as shown in FIGS. 6A-6B-6C); (ii) the sectors in the two lower elevations being checked first; (iii) stopping when the desired total N SVs in the tracking subset are selected (end condition #1); and/or (iv) stopping when all of the sectors have been searched once (end condition #2). These are but variations of one embodiment of the present invention; and the flowchart is the most convenient representation of the steps to perform in order to get the desired search pattern with the desired parameters; however, as is well-known to one of ordinary skill in the art, the specific implementation of this method would depend on the particular system, device, satellite constellation, environment, etc., involved. For example, the specific components used to implement the functions shown in FIG. 3A (and their programming) would have a great effect on how one would achieve the desired results (e.g., although FIG. 5 achieves looping through the lower elevation sectors first using, inter alia, a modulo math function in step 585, the type of programming function or functions used to achieve such a result could be completely different).

Furthermore, although in this example the azimuth plane map (FIG. 4) is a given, the chosen method for mapping and SectorIDing the azimuth plane is a significant factor in determining both the proper search pattern and how to implement it. For example, if Estimator 310 provides a fairly sizable VisList (of satellites currently in view) to Selector 320, the number and mapping of sectors could be done to maximize the likelihood that there is at least one SV in every single sector, thereby virtually guaranteeing the searching will never reach the highest elevation sectors, as every sector should have an SV. In such a case, the highest elevation loop steps 591-593-595 could be eliminated and the method could simply end when there is a "YES" answer at step 583. The variations are practically endless, as one of ordinary skill in the art could either pre-set the map, or, e.g., program a method for a system and/or device to map the azimuth plane, with differing numbers of sectors, differing numbers of elevations (or none), differing numbers of azimuth divisions, different sector shapes and/or varying dimensions based on current conditions, etc.

In the example of FIG. 5, the method tacitly assumes there is, at most, one SV in each sector (or at least the method itself does not take into account the possibility of more than one SV in a sector). This level of simplicity is only for the sake of clarity in exposition, as unduly burdening this first specific embodiment with all of the possible real world exceptions and situations (well-known to any one of ordinary skill in the art) may obscure the description of the present invention in unnecessary detail. Suffice it to say that implementing this embodiment of the present invention in a particular system and/or device would involve adding steps and factors to deal with, e.g., the extensive and constantly varying "blocking" caused by buildings in city environments, the velocity and acceleration of the GNSS receiver (in, e.g., a train or airplane), the customary lower elevation mask that excludes the lowest elevation SVs from selection (as anything 10°-15° or below is almost always blocked by the local environment)—all of the factors and problems whose range of solutions are well-known to one of ordinary skill in the art. One of the primary insights provided by the embodiments of the present invention described and claimed herein is that the selection of a subset of tracking satellites can be done by appropriate mapping and selecting instead of, or at least partially replacing and/or augmenting, the computing required to calculate, estimate, and/or approximate a subset with the best DOP of all possible subset combinations of satellites in view.

Figure 7A:
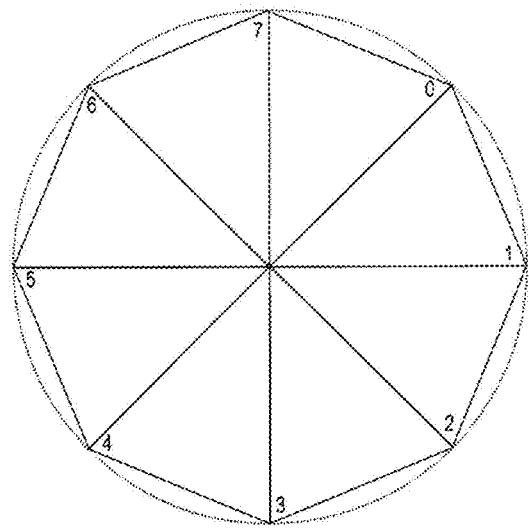
FIGS. 7A and 7B illustrate the mapping and SectorID numbering of a 2D azimuth plane and 3D "sky," respectively, with 8 azimuth divisions (or sectors), according to another embodiment of the present invention.
Figure 7B:
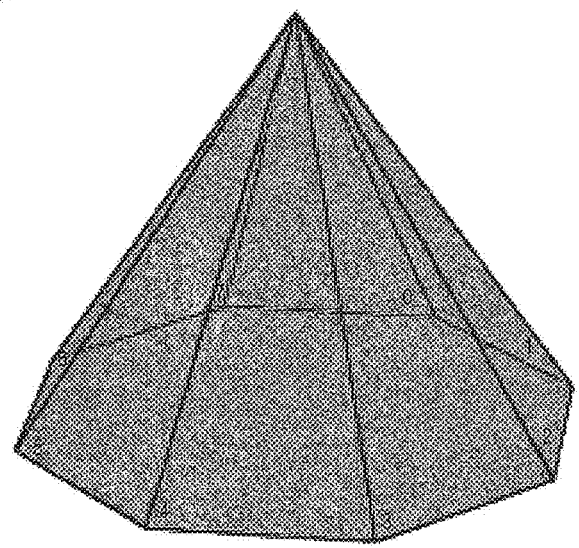

In accordance with another embodiment of the present invention, an example of mapping the "sky" is shown in FIGS. 7A and 7B, in which the sky is divided into 8 sectors (SectorIDs 0-7), each spanning the full 90° from the horizon to the zenith. FIG. 7A shows the 2D representational map (i.e., the azimuth plane), while FIG. 7B shows the 3D polyhedron formed by the eight sectors. Although it depends on the particular circumstances, the mapping in FIGS. 7A and 7B is likely to result in more than one SV per sector. In variations of this embodiment of the present invention, the number of sectors may be less or more than eight, but they will always span from the horizon to the zenith. In other words, one variation could have 360 sectors, each being a 1° slice of sky, while another could have three, each being a 120° slice of sky. Of course, when implementing this embodiment in a particular system and/or device, the sectors will not actually span that entire elevation (from horizon=0° to zenith=90°), at least because the elevation mask would block out the bottom 10° or so of each sector, but also because one of ordinary skill in the art might choose to cut off the "top" of each sector by ending them at, e.g., 75-85° so the top 5-15° (around the zenith/center) are excluded from the searching and selection process. Since the first SV selected is always the one with the highest elevation, such a variation would guarantee that the method would consider a sector "empty" rather than include an SV that will be relatively close to the first SV in the tracking subset. Once again, for the sake of simplicity and clarity of exposition, these well-known problems, situations, and possible variations are not considered in describing this specific embodiment, as all of the possibilities would obscure the description in unnecessary detail.

Figure 8:
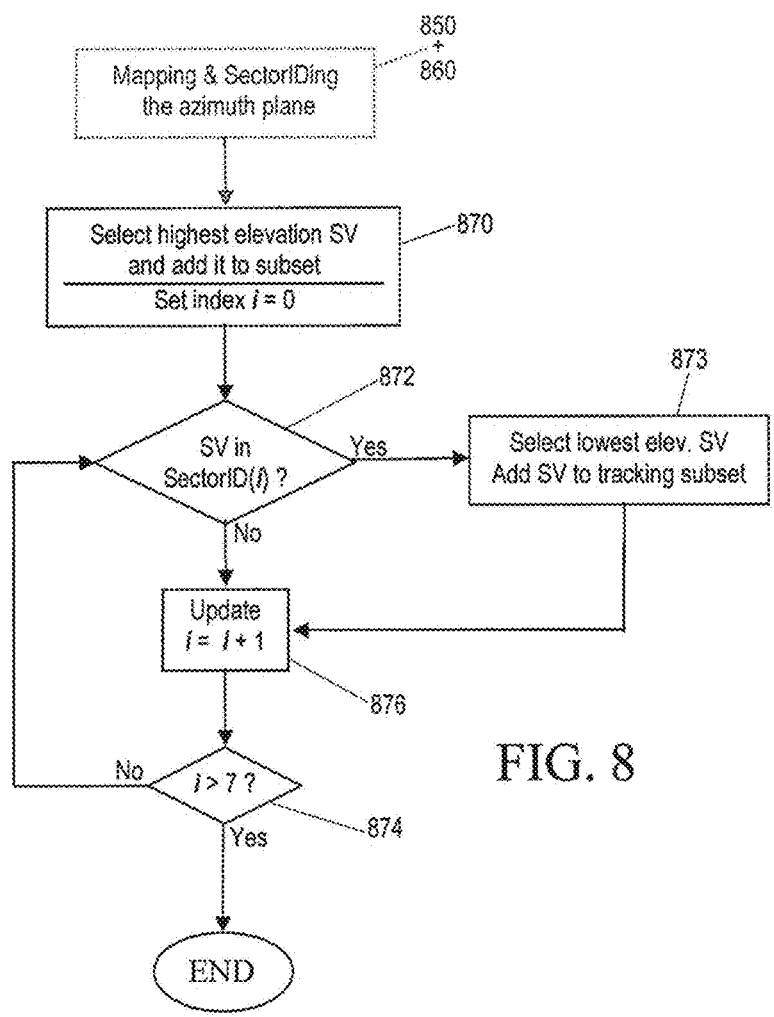
FIG. 8 is a flowchart of a method for selecting a subset of satellites in view, using the SectorID map of FIG. 7A, according to another embodiment of the present invention.

FIG. 8 is a flowchart of a method for selecting a tracking subset from all of the satellites in view, using the SectorID map of FIGS. 7A and 7B, according to an embodiment of the present invention. Using the map of FIGS. 7A and 7B, the mapping and SectorIDing steps 850 and 860 (corresponding to steps 350 and 360 in FIG. 3), respectively, have already been performed, and the method starts with step 870 (corresponding to step 370 in FIG. 3). In general, similar to the method in FIG. 5, steps 870, 872, 874, and 876 in FIG. 8 correspond to steps 370, 372, 374, and 376 in FIG. 3. The other step, 873, is another component/substep of step 372 in FIG. 3. The correspondence between the figures shows that, while FIGS. 5 and 8 embody specific embodiments of the present invention with different mapping schemes and different search patterns, they are both covered by the more general embodiment of the present invention shown in FIG. 3B—as well as many other embodiments and variations. The method in FIG. 8, contrary to the method in FIG. 5, has only one end condition, embodied in step 874, when all of the sectors have been searched.

Starting with step 870, the highest elevation SV is selected as the first SV in the subset of tracking satellites, and the iterative index i is initialized to 0. In step 872, it is determined whether there is an SV in the current sector, identified by SectorID(i), which has been initialized to 0 in step 870 and therefore corresponds to Sector 0 in the SectorID map of FIGS. 7A and 7B. If an SV is found in the current sector (which, considering the size of the sectors, is likely), the method continues to step 873, where the lowest elevation SV in the current sector is selected and added to the tracking subset. Unlike the method in FIG. 5, the method in FIG. 8, specifically in step 873, accounts for the possibility that there are multiple SVs in a sector, and selects the one closest to the horizon, thereby maximizing the volume of the polyhedron formed by the GNSS receiver and the satellite "points" (i.e., the polyhedron illustrated in FIG. 2).

If no SV is found in the current sector in step 872, or after the lowest elevation SV is selected and added to the tracking subset in step 873, the method continues with step 876, where the index is incremented by 1 (i=i+1) resulting in i=1. In this embodiment, the incremental value of one (1) leads to a simple sequential search pattern; of course, it would be possible to make a more complicated search pattern if desired. In step 874, it is determined whether the index is greater than 7. If the index is less, the answer is "NO," and the method loops back up to step 872 to check whether there is an SV in the now-current sector, SectorID(i)=Sector 1 in the SectorID map of FIGS. 7A and 7B. Thus, the method continues to loop until all eight sectors in FIGS. 7A and 7B are checked for SVs and a tracking subset (of indeterminate size) is selected. While the sequential search pattern will likely result in a tracking set of SVs that are "close to each other" (in the sense that each neighboring sector will likely have one), the resulting polyhedron will still have a substantial volume because the SVs will form "the bottom" of the polyhedron thereby maximizing its volume. Another way of looking at it is that the resulting polyhedron will look somewhat like a smaller, irregular version of the polyhedron in FIG. 7B, as the tracking subset polyhedron will be formed by "points" located in each planar sector of the FIG. 7B polyhedron at somewhat equal (lower) elevations.

The method according to the embodiment of the present invention shown in FIG. 8, inter alia, (i) is computationally extremely simple, yet results in a polyhedron of fairly large volume (thereby minimizing DOP); (ii) results in the eight lowest elevation SVs in view being selected for the tracking subset; and (iii) stops when all of the sectors have been searched once (the only end condition). As with FIG. 5, the flowchart in FIG. 8 is the most convenient and simple representation of the steps to perform in order to achieve the desired geometrical subset of tracking SVs; however, as is well-known to one of ordinary skill in the art, the specific implementation of this method would depend on the particular system, device, satellite constellation, environment, etc., involved. For example, the specific components used to implement the functions shown in FIG. 3A (and their programming) would have a great effect on how one would achieve the desired results. Also similarly to FIG. 5, although in this example the azimuth plane map (FIGS. 7A and 7B) is a given, the chosen method for mapping and SectorIDing the azimuth plane is a significant factor in determining both the proper search pattern and how to implement it. For example, if Estimator 310 provides a fairly sizable VisList (of satellites currently in view) to Selector 320, the number of sectors, and the upper and lower boundaries of the sectors could be selected to optimize the shape of the resulting polyhedron. There are many possible variations, as one of ordinary skill in the art could either pre-set the map, or, e.g., program a method for a system and/or device to map the azimuth plane, with differing numbers of sectors, differing the upper and lower boundaries for all or some of the sectors (or varying those boundaries based on other considerations), excluding sectors from the search pattern based on blocking and/or other environmental conditions, etc.

Tests comparing the tracking subset selected by the method in FIG. 5 (labeled "Method I" in FIGS. 11-12) and the tracking subset selected by the method in FIG. 8 (labeled "Method II" in FIGS. 11-12) show that both methods generate tracking subsets with acceptable DOP.

In the tests whose results are shown in FIGS. 11-12, data sets were taken for various locations, with the GNSS receiver starting at longitude 90° west and latitude 0° north and moving northwards, by 5° increments, until it reached 90° north. The latitude at which the data sets were generated is indicated by the abscissa in each of the graphs of FIGS. 11-12, while the ordinate indicates the DOP measurement. At each latitude location, the collected data set consisted of various DOP measurements, taken in one minute increments over 48 hours, for the tracking subsets of satellites selected by each of Methods I (FIG. 5) and II (FIG. 8). The other line shown in FIGS. 11-12, labelled "All in View," is the DOP of all of the satellites in view (i.e., not a tracking subset, but rather the set of all satellites, thereby resulting in the highest possible DOP). The value N for the number of SVs in the tracking subset selected by Method I was 8, while the number of SVs in the tracking subsets selected by Method II (FIG. 8) varied, but could never exceed 9 (=one near the zenith and one in each sector).

FIGS. 11A-11D show the test results when satellites from two constellations, GPS and GLONASS, were used, while FIGS. 12A-12D show the test results when only a single constellation, GPS, was used. Because of this difference, the average number of "All in View" satellites (which is equivalent to the VisList) was 17 in the testing shown in FIGS. 11A-11D, while the average number of "All in View" satellites was only 10 in the testing shown in FIGS. 12A-12D. In each set of figures (i.e., FIG. 11 or 12), FIG. A shows the average HDOP values, FIG. B shows the minimum HDOP values, FIG. C shows the variance in HDOP values, and FIG. D shows the maximum HDOP values.

Figure 12B:
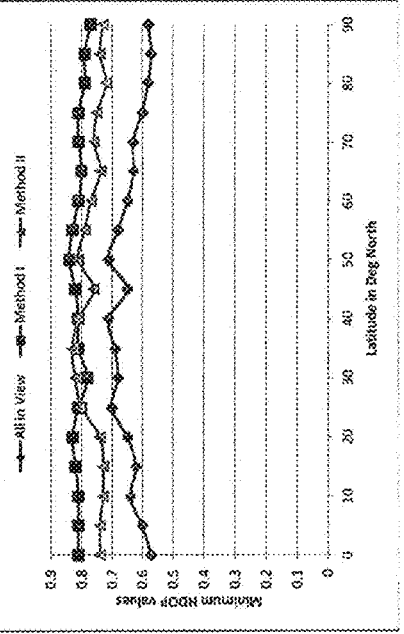
FIGS. 12A to 12D show the resulting DOP of tracking subsets selected by Method I (FIG. 5) and Method II (FIG. 8) using the satellites in view from only the GPS constellation of satellites.
Figure 12D:
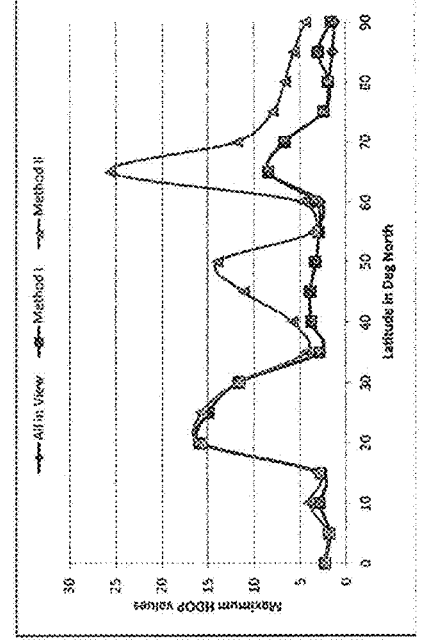
Figure 12A:
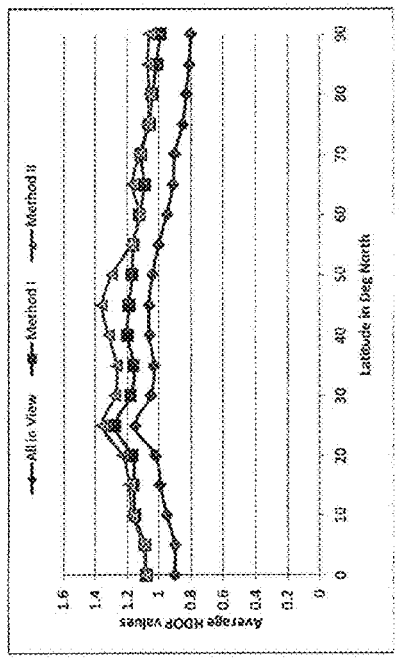
Figure 12C:
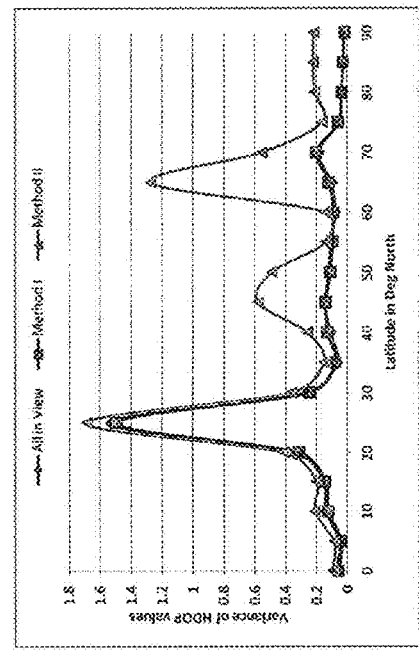

As shown in FIGS. 11-12, when more satellites are in view (i.e., in FIGS. 11A-11D), Method II (FIG. 8) outperforms Method I (FIG. 5), but when less satellites are in view (i.e., FIGS. 12A-12D), Method II (FIG. 8) also tends to have higher outbursts of HDOP than Method I (FIG. 5), as shown in FIG. 12D.

Figure 13:
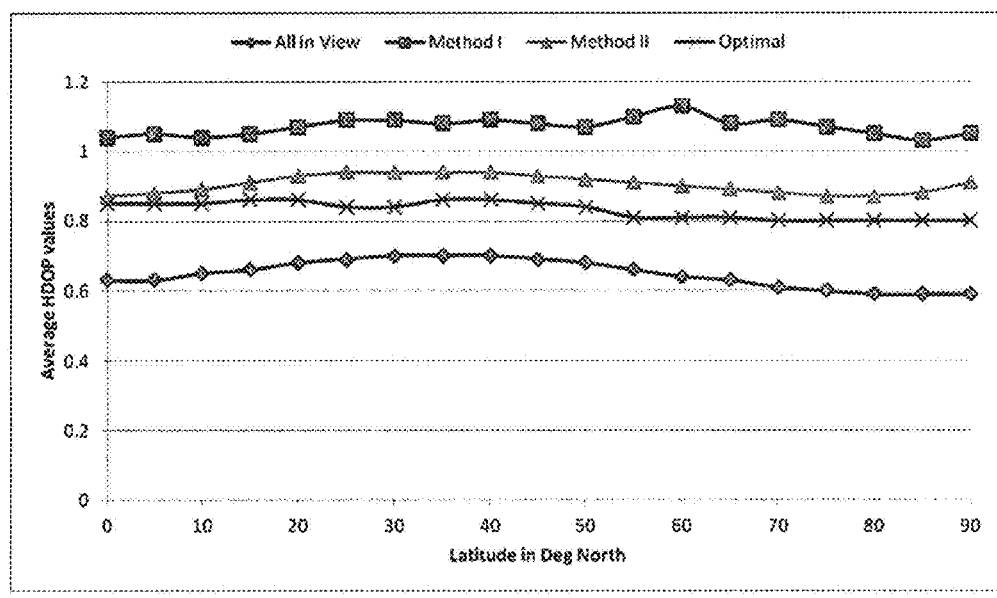
FIG. 13 shows the resulting average HDOP of tracking subsets selected by Method I (FIG. 5), Method II (FIG. 8), and by computationally intensive recursive DOP algorithms, using the satellites in view from both the GPS and GLONASS constellations of satellites.

Overall, the testing shows that both methods work. Indeed, the DOP of the resulting tracking subsets in FIGS. 11-12 are comparable with, and/or within range of, the DOP of the set of all satellites in view ("All in View"), which, after all, is an unfair and unrealistic comparison as the "All in View" set will have the maximum possible DOP by definition, and completely avoids the problem of selecting a tracking subset of satellites by instead using all of them. FIG. 13, by including the DOP for an optimal subset of tracking satellites (labeled "Optimal" in FIG. 13), provides a more fair and realistic comparison. The "Optimal" subset of tracking satellites whose DOP results are shown in FIG. 13 comprised 8 satellites selected from the satellites in view (which averaged 17) by using typical computationally intensive DOP recursive algorithms. As can be seen in FIG. 13, the average HDOP of the tracking subset selected by Method II (FIG. 8) closely tracks the average HDOP of the "Optimal" tracking subset selected using computationally intensive DOP recursive algorithms. In fact, the difference in average HDOP never even reaches 0.10 (<10%), which is remarkable, considering that Method II (FIG. 8) involved no DOP calculation whatsoever, never mind using a recursive algorithm performing hundreds of DOP calculations to find an optimal subset.

Figure 9:
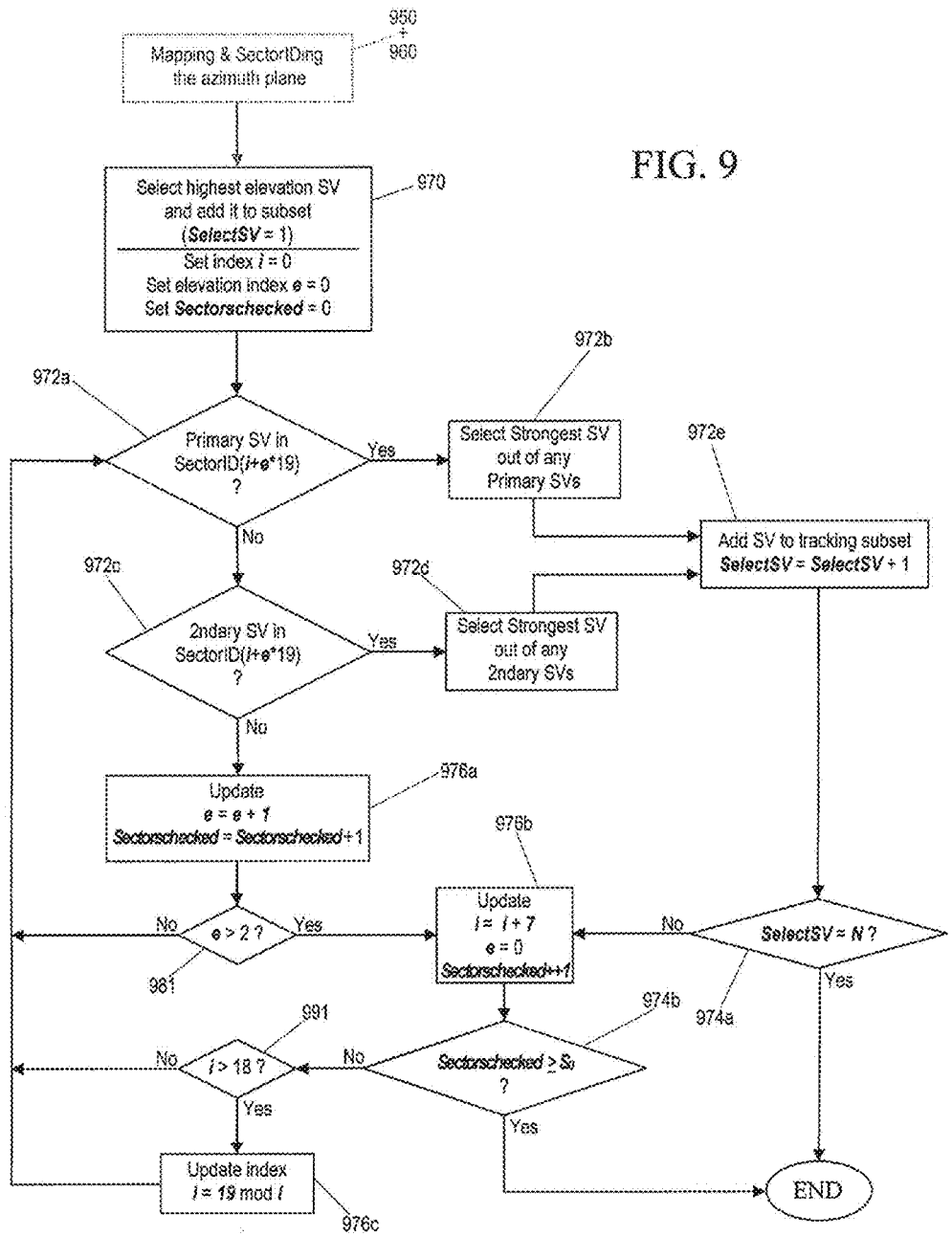
FIG. 9 is a flowchart of a method for selecting a subset of satellites in view, using the SectorID map of FIG. 4, according to yet another embodiment of the present invention.

FIG. 9 is a flowchart of a method according to another embodiment of the present invention, and indicates the flexibility and possible sophistication of embodiments of the present invention. On a broad level, the method of FIG. 9 can be seen as a combination of the methods in FIGS. 5 and 8, because it uses a prime incremental value to select sectors in sequence at adequate distances from each other (like FIG. 5) but it also takes steps to select the lowest elevation SV in each azimuth division (akin to FIG. 8). The method in FIG. 9 also takes into account having more than one constellation of satellites to choose from and the signal strength of particular SVs.

To simplify presentation, the azimuth plane map in FIG. 4 will be used in the method of FIG. 9, although, as discussed above, there is a wide variety of possible maps (and mapping strategies) that could be used. Generally speaking, the method in FIG. 9 takes the azimuth plane map in FIG. 4 one azimuth wedge at a time, and, within each azimuth wedge, starts looking for satellites first in the bottom sector, then the middle sector, then the top sector. If a satellite is found in either the bottom or middle sectors within a wedge, the method jumps to the next azimuth wedge, without searching the remaining sectors in the wedge.

Using the azimuth plane map of FIG. 4, the mapping and SectorIDing steps 950 and 960 (corresponding to steps 350 and 360 in FIG. 3), respectively, have already been performed (or pre-set), and the method starts with step 970 (corresponding to step 370 in FIG. 3). In step 970, the highest elevation SV is selected as the first SV in the subset of tracking satellites, thereby putting total number of SVs in the subset at 1 (i.e., SelectSV=1), and the iterative method is initialized by setting the iterative index i, the elevation index e, and the number of sectors checked Sectorschecked to 0.

In contrast to FIGS. 5 and 8, the steps in FIG. 9 are labeled with letters as well as numerals so that the numerals will show the correspondence between the steps in FIG. 9 and the steps in FIG. 3B. As mentioned above, there are two constellations of satellites available in the embodiment of FIG. 9, and the embodiment further designates one of the two constellations as the preferred one (the "primary"), so that its SVs will be selected for the tracking subset before the satellites in the other constellation (the "secondary" or "2ndary").

Step 972a checks whether there is an SV from the primary constellation of satellites in the current sector, identified by SectorID(i+e*19). Since the iterative index i and the elevation index e were initialized to 0 in step 970, the current sector is Sector 0 in FIG. 4. If it is determined in step 972a that there is a primary SV in the current sector, the primary SV with the strongest signal in the current sector (if there is more than one) is selected in step 972b. The measured, estimated, and/or approximated signal strength for the SV may be either in the VisList or directly received from Tracker 330 or Navigation Module 340. Once selected in step 972b, the selected primary SV is added to the subset of tracking SVs, and the count of SVs in the tracking subset is updated (SelectSV=SelectSV+1), in step 972e. If there was no primary SV in step 972a, it is determined in step 972c whether there is an SV from the secondary constellation of satellites in the current sector, Sector 0 in FIG. 4. If it is determined in step 972c that there is a secondary SV in the current sector, the secondary SV with the strongest signal in the current sector (if there is more than one) is selected in step 972d. Once selected in step 972d, the selected secondary SV is added to the subset of tracking SVs, and the count of SVs in the tracking subset is updated (SelectSV=SelectSV+1), in step 972e. Steps 972a, 972b, 972c, 972d, and 972e in FIG. 9 correspond to "selecting" step 372 in FIG. 3B.

If no primary or secondary SV is found in the current sector in steps 972a and 972c, the method continues with step 976a, where the elevation index e is incremented by 1 (e=e+1) resulting in e=1, and the count of sectors checked is updated (Sectorschecked=Sectorschecked+1). This embodiment uses the same prime numbers for the incremental value (7) and the number of azimuth divisions (19) as the method in FIG. 5, although such a condition is not necessary in this or other embodiments of the present invention. As discussed above, in order to achieve a beneficial iterative search pattern, any co-prime or relatively prime numbers can be used. For example, the method according to the embodiment of the present invention shown in FIG. 9 could use an azimuth plane map with 20 azimuth divisions and use an increment value of 11.

In step 981, it is determined whether the elevation index e is greater than 2. Since the elevation index is now 1, the answer is "NO," and the method loops back to check whether there is an SV in the current sector. Specifically, in step 972a, the sector with SectorID(i+e*19)=Sector (0+1*19)=Sector 19 in the SectorID map of FIG. 4 is checked for a primary SV. Sector 19 is the middle sector in the azimuth wedge consisting of Sectors 0, 19, and 38 in FIG. 4. As discussed above, two or more of steps 972a-972b-972c-972d-972e will be performed, depending on whether a primary or secondary SV is found in the current sector. If no SV is found, the method is back at step 976a, where the elevation index e is incremented by 1 (e=e+1) resulting in e=2, and the count of sectors checked is updated. Once again, the elevation index e is not greater than 2 in step 981, so the method loops back to steps 972a-972b-972c-972d-972e to check whether there is an SV in the current sector, which is now SectorID(i+e*19)=Sector (0+2*19)=Sector 38 in the SectorID map of FIG. 4, the top sector in the azimuth wedge consisting of Sectors 0, 19, and 38.

The above paragraph traces what happens if no SV is found in the bottom two sectors of the azimuth wedge consisting of Sectors 0, 19, and 38. If an SV is found (and selected, etc., in steps 972a-972b-972c-972d-972e), the method goes from step 972e to step 974a, where it is determined if the number of SVs in the tracking subset has reached the desired total of N (SelectSV=N?). If so, the method ends. If not (as would be the case here, since only the first azimuth wedge has been checked), the method continues at step 976b, where index i is incremented by 7 (i=i+7) resulting in i=7, the elevation index e is reset to 0 (e=0), and the count of sectors checked is updated. In effect, step 976b makes the method jump to the next azimuth wedge, regardless of which sector within the current azimuth wedge is the current sector. This is a helpful twist, for, in terms of the volume of the polyhedron, it is better to seek a low elevation SV in another wedge than continue looking for another SV higher up in the current azimuth wedge.

Next, it is determined in step 974b whether the total count of sectors checked is equal to, or greater than, $S_0$, which can be any suitable value less than the total number of sectors in the map (as that number should never be reached because of wedge-jumping step 976*b*). As an arbitrary example, $S_O$ could be 25, which would ensure that the selected SVs (regardless of number) could only be in a specific set of possible sectors, but would also ensure that the method would start over again (as indicated by the endless loop of FIG. 3A) at a certain point when conditions have changed and SVs may be found in previously empty sectors. As would be understood by one of ordinary skill in the art, the available end conditions here and/or in any of the other embodiments of the present invention are practically without limit, and thus can be molded to the needs and conditions of the particular implementation, and include, without limitation, a time limit (for a forced restart, or for a forced time to wait for better conditions), the number of primary SVs already in the subset (based on the assumption the primaries are somehow better than the secondaries), the average elevation of the SVs in the subset (e.g., if low enough, a large enough volume polyhedron has been achieved), the average signal strength of the SVs in the subset, etc. Furthermore, one or more thresholds could be established to change the conditions of the method—e.g., if an SV is found in the bottom of each of the first three wedges searched, a counter could be set to stop the method from searching after a certain number of additional wedges and/or sectors are searched (as a matter of diminishing returns for additional time spent); or a threshold to maintain a certain ratio between the primary and secondary SVs in the tracking subset; or the method could start out looking only for primary SVs and then if a certain number of primary SVs are not found after a certain number of sectors have been checked, the method starts looking for secondary SVs as well, etc.

If end condition $S_O$ is not met in step 974*b*, it is determined, in step 991, whether index i is greater than 18 (i>18?). If so, the method continues at step 976*c*, where index i is updated to i=19 mod i, resulting in a number less than 19. Steps 991 and 976*c* guarantee that, after the elevation index e has been reset to 0 in step 976*b*, index i will indicate one of the bottom 19 sectors (0-18) in SectorID(i+e*19) in steps 972*a*-972*c*. Continuing from the example above, where index i is now 7 (having been incremented after the first azimuth wedge comprising Sectors 0-19-38 has been checked for SVs), index i is less than 18 in step 991 (i>18?), so the method loops back to steps 972*a*-972*b*-972*c*-972*d*-972*e* to check whether there is an SV in the current sector, which is now SectorID(i+e*19)=Sector (7+0*19)=Sector 7 in the SectorID map of FIG. 4, the bottom sector in the azimuth wedge consisting of Sectors 7, 26, and 45. Thus, now the method goes through Sectors 7, 26, and 45 searching for primary and/or secondary SVs, and then, if one is found (or none is found), will jump to the next azimuth wedge, as described above. Specifically, once an SV is found in that azimuth wedge (or if none is found), the method returns to update step 976*b*, where index i is again incremented by 7 (i=i+7) resulting in i=14, the elevation index e is reset to 0 (e=0), and the count of sectors checked is updated. The method starts anew at the bottom sector, SectorID(i+e*19)=Sector (14+0*19)=Sector 14, of the azimuth wedge comprising Sectors 14-33-52 in the SectorID map of FIG. 4.

In terms of azimuth wedges, the method of FIG. 9 duplicates the search pattern of FIG. 5 as shown in FIG. 6B, i.e., the "1", "2", and "3" in FIG. 6B are in the bottom-most sectors of the first three azimuth wedges searched in the method of FIG. 9. However, the "4" in FIG. 6B indicates the middle sector (21) of the fourth wedge (comprising Sectors 2-21-40) searched in the method of FIG. 9, but steps 991-976*c* ensure that the method in FIG. 9 starts at the bottom-most sector because, when i>18 in step 991, index i is updated to i=19 mod i=19 mod (21)=2 in step 976*c*, resulting in Sector 2 being the current sector when the method loops back to steps 972*a*-972*b*-972*c*-972*d*-972*e*. Thus, FIG. 6C, whose large numerals indicate the sectors searched in the first two loops of the method in FIG. 5, also shows the first 11 azimuth wedges searched in the method of FIG. 9. Once again, the use of prime, co-prime, and/or relatively prime numbers for the incremental value and the number of azimuth divisions result in a wide scattering of azimuth wedges in the method of FIG. 9, where the search of a wedge neighboring a previously searched wedge does not occur until the ninth wedge, and, as is true regarding the sectors searched in FIG. 5, no wedge is ever searched twice.

As mentioned above, the method according to the embodiment of the present invention shown in FIG. 9 results in, inter alia, (i) the lowest elevation SV being selected in every azimuth wedge; (ii) the stoppage of searching in a particular wedge once an SV is found; (iii) the SVs in the primary constellation being given preferred status for selection in the tracking subset; and (iv) the selection of the SV with the strongest signal in the sector when there are multiple SVs to select from. As discussed above in reference to the methods shown in FIGS. 5 and 8, the flowchart in FIG. 9 is the most convenient representation of the steps to perform in order to get the desired search pattern with the desired parameters; however, as is well-known to one of ordinary skill in the art, the specific implementation of this method would depend on the particular system, device, components, programming, satellite constellation, environment, etc., involved. Furthermore, as discussed above in reference to the methods shown in FIGS. 5 and 8, although in this example the azimuth plane map of FIG. 4 is a given, the chosen method for making the SectorID map is a significant factor in determining both the proper search pattern and how to implement it, as the variations one of ordinary skill in the art would be able to implement are practically endless, including, e.g., programming a method for a system and/or device to adaptively generate an azimuth plane map and/or modify/select the searching method based on current conditions.

Figure 10:
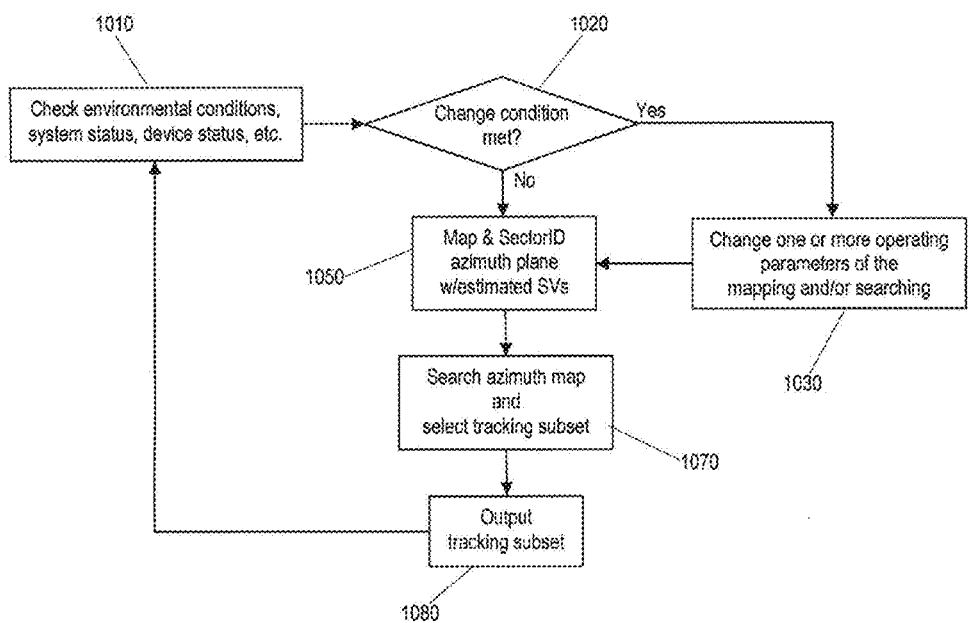
FIG. 10 is a flowchart of a method for monitoring conditions and changing operating parameters of the mapping and/or selection process, according to an embodiment of the present invention.
Figure 11A:
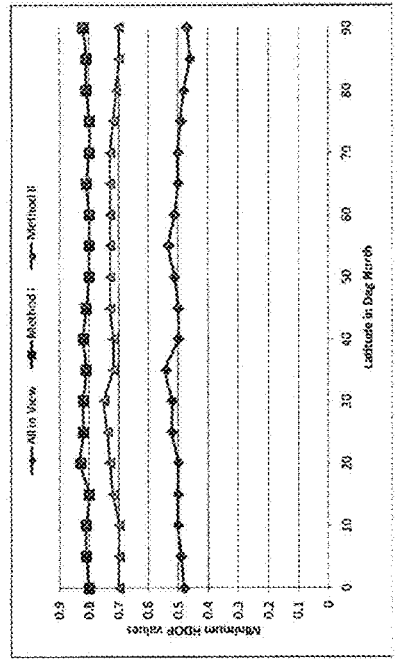
FIGS. 11A to 11D show the resulting DOP of tracking subsets selected by Method I (FIG. 5) and Method II (FIG. 8) using the satellites in view from both the GPS and GLONASS constellations of satellites.
Figure 11B:
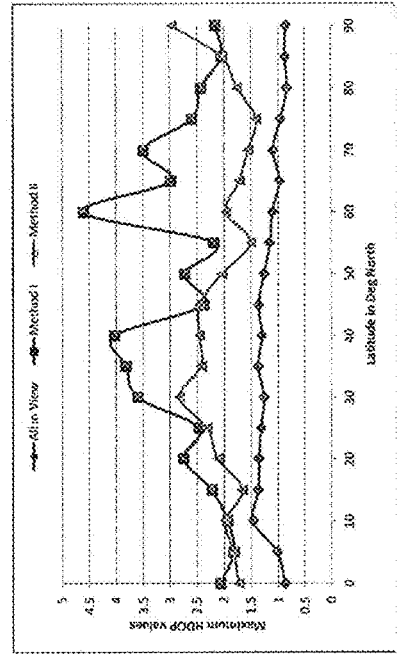
Figure 11C:
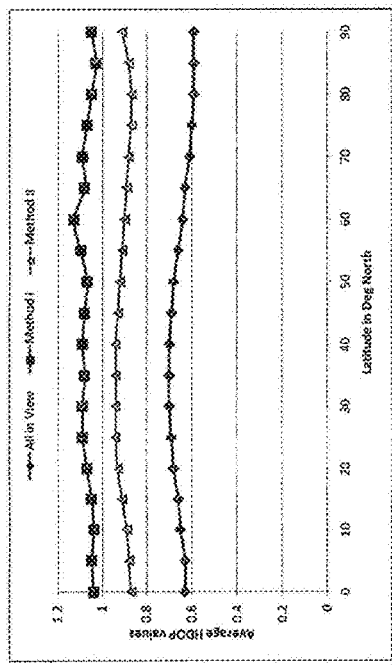
Figure 11D:
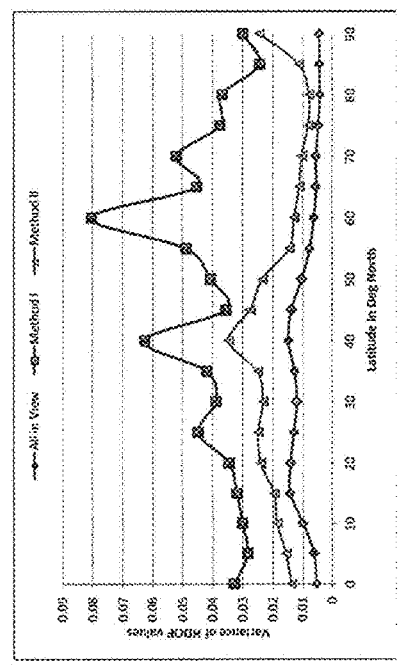

FIG. 10 is a flowchart of method by which a GNSS system and/or device can modify one or more variables, steps, and/or parameters of the mapping and searching of the azimuth plane in response to changing conditions, according to one embodiment of the present invention. In step 1010, the one or more conditions which the GNSS system/device is monitoring are checked. Such conditions include, but are not limited to, environmental conditions (such as, e.g., blocking in an urban environment), the resources available to the GNSS system/device (such as, e.g., the number of SVs on the VisList, the number of available constellations, the computing/power resources available in a mobile GNSS receiver, etc.), the desired accuracy of the navigational results (in an embodiment where either the user or functions/components of the system/device itself can indicate a preference), overall system conditions (in, e.g., an embodiment using an augmented navigational system), etc.

In step 1020, it is determined whether the change condition is met, i.e., whether the one or more conditions checked in step 1010 have changed to the extent that one or more changes to the operating parameters of the mapping and/or searching of the azimuth plane would be beneficial. If the one or more change conditions are met in step 1020, the one or more operating parameters are changed in step 1030. For example, in an embodiment of the method in FIG. 8 where the sectors have top and bottom boundaries below the zenith and above the horizon (or elevation mask), respectively, one or both of those boundaries could be moved to expand the size of the search area if the number of SVs on the VisList falls below a certain threshold. As another example using the same change condition, the GNSS system/device could use Method II (FIG. 8) if the number of SVs on the VisList is over the threshold, and switch to Method I (FIG. 5) when the number of SVs on the VisList falls below that threshold. As yet another example using the same change condition, an embodiment using the method in FIG. 9 could eliminate steps 972c-972d (searching/selecting secondary SVs) if the number of SVs on the VisList is over the threshold, and bring those steps back if the number of SVs falls below the threshold. Of course, in embodiments with more than one change condition, there may be more than one possible change in operating parameters, depending on which change condition, or which combination of change conditions, is met. Furthermore, there may be one overall change condition and multiple responses—e.g., in the example of the number of SVs on the VisList as the change condition, there may be multiple thresholds, each with a different corresponding change (or changes) in one or more operating parameters.

Once the one or more operating parameters are changed in step 1030, or if the one or more change conditions are not met in step 1020, mapping is performed in step 1050 (which corresponds to steps 350 and 360 in FIG. 3B), and then search and selection is performed in step 1070 (corresponding to steps 370-372-374-376 in FIG. 3B). Of course, in embodiments with set parameters for the azimuth plane map, step 1050 would not necessarily be performed (if any "mapping" is performed in such an embodiment, it would only be insofar as, e.g., the SVs on the VisList would need to be placed in the preset sectors, and/or the starting point for the map framework would have to be determined, etc.). In step 1080, the resulting tracking subset is output and the method starts the loop again at step 1010.

Like FIGS. 3A-B above, the method in FIG. 10 should be understood as a conceptual framework. For example, the steps do not necessarily need to occur in the order shown in FIG. 10: in some embodiments, the checking and changing steps 1010-1020-1030 may be performed between steps 1050 and 1070. As another example, one or more of the steps may be performed substantially simultaneously: in some embodiments, one or more of checking and changing steps 1010-1020-1030 may be performed simultaneously with, and/or be continuously providing feedback that changes, one or both of steps 1050 and 1070. Furthermore, each step may be implemented in hardware, software, or a combination of hardware and software, and, as discussed in reference to FIGS. 3A and 3B above, one or more steps may be merged together and/or a single step may be further divided into sub-steps. Similarly, the steps may be performed on the same or completely different pieces of hardware, software, or combinations of hardware and software, and may be further distributed so that one or more steps or sub-steps are performed in devices and/or systems separate from the GNSS receiver. The specifics of how the one or more steps are merged, separated, and/or otherwise implemented in hardware, software, or a combination of hardware and software depends on a number of factors, as is well-known to one of ordinary skill in the art.

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A method for a receiver in a satellite navigational system, comprising:
    selecting a satellite with a highest elevation of a set of satellites in view for a tracking subset; and
    selecting a plurality of satellites for the tracking subset by searching, in a sequence, a plurality of sectors in an azimuth plane, which includes:
        determining whether there is a satellite in view in a sector of the plurality of sectors being searched.

2. The method of claim 1, wherein the plurality of sectors are formed by dividing at least a portion of the azimuth plane into a plurality of azimuth divisions.

3. The method of claim 1, wherein the plurality of sectors are formed by dividing at least a portion of the azimuth plane into a plurality of elevations.

4. The method of claim 1, wherein the plurality of sectors are formed by dividing at least a portion of the azimuth plane into a plurality of azimuth divisions and one or more elevations, where each sector of the plurality of sectors is formed by the boundaries of an azimuth division and the one or more elevations.

5. The method of claim 1, wherein each sector of the plurality of sectors has an alphanumeric SectorID.

6. The method of claim 1, wherein each sector of the plurality of sectors has a sequentially numbered SectorID.

7. The method of claim 6, wherein selecting the plurality of satellites for the tracking subset comprises:
    searching a current sector having a SectorID equal to an index i;
    incrementing the index i with an incremental value x such that i=i+x; and
    returning to searching a current sector having a SectorID equal to index i.

8. The method of claim 7, wherein at least a portion of the azimuth plane is divided into a plurality of azimuth divisions, and at least one of the number of azimuth divisions and the incremental value x is a prime number.

9. The method of claim 7, wherein at least a portion of the azimuth plane is divided into a plurality of azimuth divisions, and the number of azimuth divisions is one of co-prime and relatively prime to the incremental value x.

10. The method of claim 1, wherein selecting a plurality of satellites for the tracking subset further comprises:
    if it is determined there is a satellite in view in the sector being searched, selecting the satellite in view for the tracking subset.

11. The method of claim 1, wherein selecting a plurality of satellites for the tracking subset further comprises:
    if it is determined there is a satellite in view in the sector being searched, selecting a satellite with a lowest elevation of any satellites in view in the sector being searched.

12. The method of claim 1, wherein selecting a plurality of satellites for the tracking subset further comprises:
    if it is determined there is a satellite in view in the sector being searched, selecting a satellite with a strongest signal of any satellites in view in the sector being searched.

13. The method of claim 1, further comprising:
    monitoring one or more conditions of at least one of the satellite navigational system, the receiver, and an operating environment of the receiver, to determine if one or more change conditions have been met; and
    if one or more change conditions have been met, changing one or more parameters for selecting a plurality of satellites for the tracking subset by searching, in a sequence, the plurality of sectors in the azimuth plane.

14. The method of claim 1, further comprising:
receiving a list of the set of satellites in view, including estimated azimuth and elevation for each of the satellites in view.

15. The method of claim 14, further comprising:
based on the list of the set of satellites in view, changing one or more parameters for selecting a plurality of satellites for the tracking subset by searching, in a sequence, a plurality of sectors in the azimuth plane.

16. The method of claim 1, further comprising:
dividing at least a portion of the azimuth plane into the plurality of sectors.

17. The method of claim 16, further comprising:
monitoring one or more conditions of at least one of the satellite navigational system, the receiver, and an operating environment of the receiver, to determine if one or more change conditions have been met; and
if one or more change conditions have been met, changing one or more parameters for dividing at least a portion of the azimuth plane into the plurality of sectors.

18. A method for a receiver of a satellite navigational system, comprising:
selecting a satellite with a highest elevation of a set of satellites in view for a tracking subset; and
selecting a plurality of satellites for the tracking subset by searching, in a sequence, a plurality of sectors in an azimuth plane,
wherein, if it is determined that a satellite is blocked, a sector in the azimuth plane where the blocked satellite is located is not searched in the step of selecting the plurality of satellites for the tracking subset by searching, in sequence, a plurality of sectors in the azimuth plane.

19. A receiver in a satellite navigational system, comprising:
one or more processors; and
at least one non-transitory computer-readable medium having program instructions recorded thereon, the program instructions configured to have the one or more processors:
select, for a tracking subset of satellites from a set of satellites in view, a satellite with a highest elevation from the satellites in view; and
select a plurality of satellites for the tracking subset by searching, in a sequence, a plurality of sectors in an azimuth plane, which includes:
determining whether there is a satellite in view in a sector of the plurality of sectors being searched.

20. A system including a receiver in a satellite navigational system, comprising:
one or more processors; and
at least one non-transitory computer-readable medium having program instructions recorded thereon, the program instructions configured to have the one or more processors:
select, for a tracking subset of satellites from a set of satellites in view, a satellite with a highest elevation from the satellites in view; and
select a plurality of satellites for the tracking subset by searching, in a sequence, a plurality of sectors in an azimuth plane;
monitor one or more conditions of at least one of the satellite navigational system, the receiver, and an operating environment of the receiver, to determine if one or more change conditions have been met; and
if one or more change conditions have been met, change one or more parameters for selecting a plurality of satellites for the tracking subset by searching, in a sequence, the plurality of sectors in the azimuth plane.

21. The system of claim 20, wherein the program instructions are further configured to have the one or more processors:
divide at least a portion of the azimuth plane into the plurality of sectors.

22. A method for a system including a receiver in a satellite navigational system, comprising:
selecting, for a tracking subset of satellites from a set of satellites in view, a satellite with a highest elevation from the satellites in view; and
selecting a plurality of satellites for the tracking subset by searching, in a sequence, a plurality of sectors in an azimuth plane;
monitoring one or more conditions of at least one of the satellite navigational system, the receiver, and an operating environment of the receiver, to determine if one or more change conditions have been met; and
if one or more change conditions have been met, changing one or more parameters for selecting a plurality of satellites for the tracking subset by searching, in a sequence, the plurality of sectors in the azimuth plane.

23. The method of claim 22, wherein the system comprises a portable electronic device.

* * * * *